(12) United States Patent
Subramanian et al.

(10) Patent No.: US 12,001,724 B2
(45) Date of Patent: Jun. 4, 2024

(54) FORWARDING OPERATIONS TO BYPASS PERSISTENT MEMORY

(71) Applicant: NetApp Inc., San Jose, CA (US)

(72) Inventors: Ananthan Subramanian, San Ramon, CA (US); Matthew Fontaine Curtis-Maury, Apex, NC (US); Vinay Devadas, Apex, NC (US); Bulli Venkata Rajesh Vipperla, Morrisville, NC (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/089,633

(22) Filed: Dec. 28, 2022

(65) Prior Publication Data

US 2023/0139582 A1 May 4, 2023

Related U.S. Application Data

(62) Division of application No. 17/216,869, filed on Mar. 30, 2021, now Pat. No. 11,544,007.

(51) Int. Cl.
*G06F 12/00* (2006.01)
*G06F 3/06* (2006.01)
*G06F 15/173* (2006.01)

(52) U.S. Cl.
CPC .......... *G06F 3/0659* (2013.01); *G06F 3/0619* (2013.01); *G06F 3/064* (2013.01); *G06F 3/067* (2013.01); *G06F 15/17331* (2013.01)

(58) Field of Classification Search
CPC ...... G06F 3/0659; G06F 3/0619; G06F 3/064; G06F 3/067; G06F 15/17331

USPC ......................................................... 711/154
See application file for complete search history.

(56) References Cited

U.S. PATENT DOCUMENTS

| 9,213,609 | B2 | 12/2015 | Hansen et al. |
| 9,697,219 | B1* | 7/2017 | Wang ................. G06F 16/1734 |
| 11,544,007 | B2 | 1/2023 | Subramanian et al. |
| 2009/0287902 | A1 | 11/2009 | Fullerton et al. |
| 2012/0066181 | A1* | 3/2012 | Adkins ................. G06F 16/162 |
| | | | 707/639 |
| 2014/0195480 | A1 | 7/2014 | Talagala et al. |

FOREIGN PATENT DOCUMENTS

WO WO-2005071551 A2 * 8/2005 ........... G06F 16/172

OTHER PUBLICATIONS

Notice of Allowance dated Aug. 31, 2022 for U.S. Appl. No. 17/216,869, filed Mar. 30, 2021, 8 pages.

* cited by examiner

*Primary Examiner* — Mardochee Chery
(74) *Attorney, Agent, or Firm* — Cooper Legal Group, LLC

(57) ABSTRACT

Techniques are provided for forwarding operations to bypass persistent memory. A modify operation, targeting an object, may be received at a persistent memory tier of a node. If a forwarding policy indicates that forwarding is not enabled for the modify operation and the target object, then the modify operation is executed through a persistent memory file system. If the forwarding policy indicates that forwarding is enabled for the modify operation and the target object, then the modify operation is forwarded to a file system tier as a forwarded operation for execution through a storage file system.

23 Claims, 12 Drawing Sheets

FORWARDING OPERATIONS TO BYPASS PERSISTENT MEMORY

RELATED APPLICATIONS

This application claims priority to and is a divisional of U.S. application Ser. No. 17/216,869, filed on Mar. 30, 2021, now allowed, titled "FORWARDING OPERATIONS TO BYPASS PERSISTENT MEMORY," which is incorporated herein by reference.

BACKGROUND

A node, such as a server, a computing device, a virtual machine, a cloud service, etc., may host a storage operating system. The storage operating system may be configured to store data on behalf of client devices, such as within volumes, aggregates, storage devices, cloud storage, locally attached storage, etc. In this way, a client can issue read and write operations to the storage operating system of the node in order to read data from storage or write data to the storage. The storage operating system may implement a storage file system through which the data is organized and accessible to the client devices. The storage file system may be tailored for managing the storage and access to data within a particular type of storage media, such as block-addressable storage media of hard drives, solid state drives, and/or other storage. The storage media and the storage file system may be managed by a file system tier of the node. The node may also comprise other types of storage media, such as persistent memory that provides relatively lower latency compared to the storage media managed by the file system tier. The persistent memory may be byte-addressable, and is managed by a persistent memory tier tailored for the performance and persistence semantics of the persistent memory.

DETAILED DESCRIPTION

Figure 1:
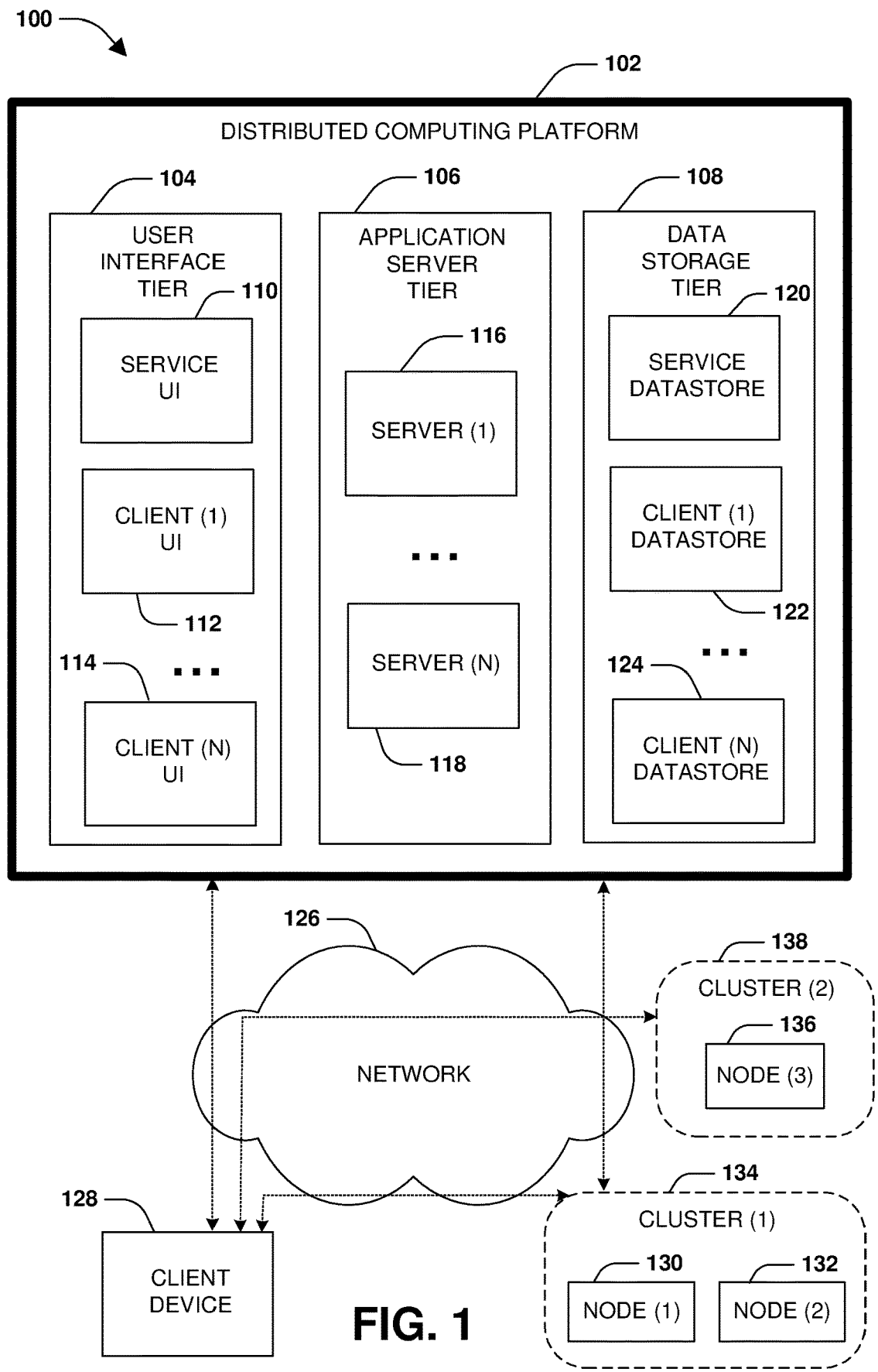
FIG. 1 is a block diagram illustrating an example computing environment in which an embodiment of the invention may be implemented.

The techniques described herein are directed to the forwarding of operations to bypass persistent memory. A node may comprise a persistent memory tier configured to store data within persistent memory through a persistent memory file system. The node may comprise a file system tier configured to store data within storage through a storage file system. The persistent memory may provide relatively lower latency compared to the storage of the file system tier. Thus, certain data from the storage of the storage file system may be copied (tiered) into the persistent memory in order to provide client devices with faster access to the copied data through the persistent memory file system. The original data may still be maintained within the storage of the storage file system. As modify operations are executed upon the persistent memory to change the data within the persistent memory, the data within the persistent memory may diverge from the original data within the storage of the storage file system.

Because two instances of the tiered data of the frontend file system may be stored across both the storage of the storage file system and the persistent memory, an original instance of the tiered data within the storage of the storage file system may become stale/old. The original instance of the tiered data may become stale because newer data may have been written to the tiered instance of the tiered data within the persistent memory. To prevent stale data from being provided to clients or operated upon, the node (e.g., file systems, operating systems, and services of the node) may be configured to consider data within the persistent memory as being the authoritative copy for any data blocks that have been tiered to the persistent memory and are tracked by the persistent memory file system. This configuration is referred to as an invariant that is implemented so that client operations can be executed upon the persistent memory comprising the authoritative copy of data so that clients are not accessing stale/old data. Processing the client operations using the persistent memory reduces the latency associated with processing the client operations due to the lower latency characteristics of the persistent memory. With this invariant, any blocks of data that have been copied (tiered) into the persistent memory and/or residing within the persistent memory will be the authoritative copy of the data with respect to corresponding blocks within the storage of the storage file system.

Processing the client operations using the persistent memory reduces the latency associated with processing the client operations due to the lower latency characteristics of the persistent memory. At a subsequent point in time, a framing process may be performed to identify more up-to-date data within the persistent memory compared to corresponding data in the storage of the storage file system. For example, the framing process may evaluate modify timestamps of data blocks to identify data blocks that have been modified since a last framing process. In another example, write operations may set flags for data blocks when new data is written to the data blocks, and thus the flags may indicate that the data blocks comprise the more up-to-date data. In this way, the framing process may be performed where the persistent memory tier notifies the file system tier that more up-to-date data is stored within the persistent memory compared to what is stored within the storage by the storage file system of the file system tier. In this way, the file system tier can refer to and/or retrieve the more up-to-date data from the persistent memory for storage into the storage of the storage file system.

Certain types of operations may be better suited for being executed through the storage file system upon the storage as opposed to being executed through the persistent memory file system upon the persistent memory. In some embodiments, certain operations may be identified as being inefficient to execute through the persistent memory file system, such as multi-block sequential write operations, partial write operations, hole punch operations, etc., which would be more efficient to execute through the storage file system upon the storage and/or operations targeted data blocks not tiered to the persistent memory. Accordingly, as provided herein, these operations may bypass execution by the persistent memory file system, and may be forwarded to the storage file system as forwarded operations for execution through the storage file system upon the storage.

The forwarding of operations are performed in manner that preserves the invariant that the authoritative copy of data is maintained in the persistent memory by removing data from the persistent memory that has become stale due to the forwarding. Otherwise, clients may be served stale data and/or file system inconsistencies between the storage file system and the persistent memory file system may result. To ensure that stale data is not stored within the persistent memory, when forwarding an operation to write new data to a block within the storage of the storage file system, a stale copy of the data is removed from a corresponding block in the persistent memory. The removal of the stale copy of the data from the persistent memory may be performed prior to the operation being forwarded to the storage file system or after the new data has been written to the storage of the storage file system.

In some embodiments, forwarding of modify operations may be performed during framing so that a framing backlog of blocks having more up-to-date data within the persistent memory is not growing due to incoming modify operations otherwise being executed upon the persistent memory. But, since the modify operations are being forwarded and are bypassing the persistent memory, the framing backlog is not growing. Framing is performed by the persistent memory tier to notify the file system tier of blocks within the persistent memory that comprise more up-to-date data than corresponding blocks in the storage of the storage file system.

During framing, if incoming modify operations continue to be executed against the persistent memory to write new data to the persistent memory, then the framing backlog of blocks, having more up-to-date data, that are to be identified and indicated to the file system tier will continue to grow, thus hindering the ability for the framing process to complete. In this way, these modify operations are instead forwarded to the storage file system, and bypass the persistent memory file system so that the framing backlog is not increasing. In some embodiments, forwarding may be implemented for other use cases, such as during the creation of a snapshot of data stored across the storage file system and the persistent memory file system, the creation of file clones, hole punching to make unused blocks of data available to store new data, partial write operations targeting less than a full block of data (e.g., less than a 4 kb block of data), etc.

Forwarding has various interactions with other storage functions, and thus forwarding of operations are performed in a manner that maintains consistency of the file systems and ensures clients are not served with stale data due to these interactions between forwarding and the other storage functions. In some embodiments, forwarding may be performed in manner that addresses race situations between forwarded operations and framing operations. For example, if a forwarded operation and a pending framing operation target a same object, then the forwarded operation and the pending framing operation are synchronized by either suspending the forwarded operation or causing the pending framing operation to skip the object based upon an internal state of the object (e.g., a state indicating progress of the object being stored/flushed to persistent memory) and/or other conditions.

Additionally, forwarding may be performed during a consistency point operation and/or a log replay operation in a manner that enforces file system correctness. For example, when a forwarded operation is implemented to write new data to the storage of the storage file system and remove the stale data from the persistent memory of the node, a remote direct memory access transfer is implemented to notify a partner node of the changes. In this way, the partner node can mirror the changes to local persistent memory and/or storage so that the partner node maintains a mirrored copy of data stored by the node, which can be used for data redundancy and failover purposes.

A consistency point operation is blocked from being implemented until all pending remote direct memory access transfers are complete. This ensures consistency between the node and the partner node. In an example of ensuring consistency when replaying forwarded operations within a log during a takeover process for a failed node, the partner node may mirror operations to the node, and the node may log the operations into a log. If the partner node fails, then the node will replay the log and takeover the processing of client operations in place of the failed partner node. During replay, framing operations that target blocks with unknown states are replayed (e.g., blocks that are not part of the persistent memory file system, and are merely tracked by the storage file system), while framing operations that target blocks with known states are skipped (e.g., blocks that are tracked and owned by the persistent memory file system, and are thus deemed to comprise the authoritative copy of data due the invariant).

Various embodiments of the present technology provide for a wide range of technical effects, advantages, and/or improvements to computing systems and components. For example, various embodiments may include one or more of the following technical effects, advantages, and/or improvements: 1) the ability to forward certain operations to a storage file system and bypass a persistent memory file system because these operations are more efficient, less complex, and faster to execute through the storage file system; 2) implementing forwarding in order to provide the ability to create snapshots, file clones, perform hole punching, and implement partial writes for a storage system implementing both a storage file system and a persistent memory file system; 3) preserving an invariant that persistent memory is to have the authoritative copy of data notwithstanding operations bypassing the persistent memory file system during forwarding, which ensures file system consistency and ensures that stale data is not served to clients; 4) the ability to ensure file system consistency and user data consistency when forwarding is implemented during framing by synchronizing forwarded operations and pending framing operations; 5) the ability to perform a consistency point to accept and store (flush) modifications to a storage device while keeping data consistent between the node and a partner node; and 6) the ability to selectively replay operations within a log (an NVLog) during a failover situation without data loss and without placing the persistent memory file system in an incorrect state.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc., which may be part of a on-premise, cloud-based, or hybrid storage solution.

A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage.

The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In some embodiments, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices.

A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In some embodiments, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

Deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device.

Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an embodiment of background deduplication, data blocks that are duplicated between files are rearranged within storage units such that one copy of the data occupies physical storage. References to the single copy can be inserted into a file system structure such that all files or containers that contain the data refer to the same instance of the data.

Deduplication can be performed on a data storage device block basis. In an embodiment, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, and the like. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number.

For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file.

The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In some embodiments, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some embodiments, a data transfer protocol, referred to as the LRSE (Logical Replication for Storage Efficiency) protocol, can be used as part of replicating consistency group differences from the first node 130 to the second node 132.

In the LRSE protocol, the second node 132 maintains a history buffer that keeps track of data blocks that the second node 132 has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an embodiment, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an embodiment, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an embodiment, various types of synchronization may be implemented by a synchronization module associated with the storage operating system. In an embodiment, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an embodiment, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an embodiment, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an embodiment, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business-related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
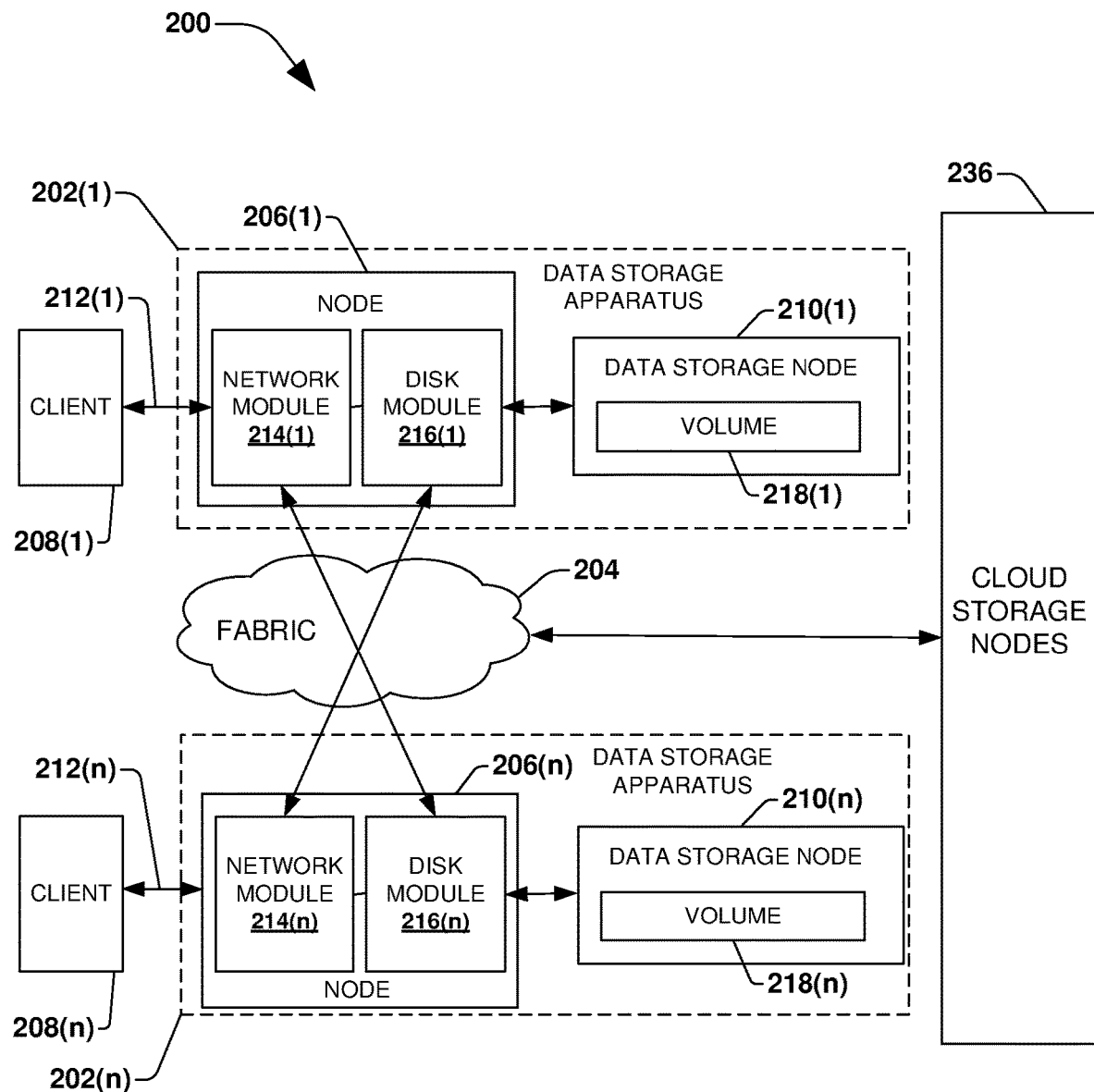
FIG. 2 is a block diagram illustrating an example of a network environment with exemplary nodes in accordance with an embodiment of the invention.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, nodes 206(1)-206(n), for example), although any number of other elements or components can also be included in the clustered network environment 200 in other examples. This technology provides a number of advantages including methods, non-transitory computer readable media, and computing devices that implement the techniques described herein.

In this example, nodes 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The nodes 206(1)-206(n) may be implemented as hardware, software (e.g., a storage virtual machine), or combination thereof.

The data storage apparatuses 202(1)-202(n) and/or nodes 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The nodes 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such nodes 206(1)-206(n) can be attached to the cluster fabric 204 at a connection point, redistribution point, or communication endpoint, for example. One or more of the nodes 206(1)-206(n) may be capable of sending, receiving, and/or forwarding information over a network communications channel, and could comprise any type of device that meets any or all of these criteria.

In an embodiment, the nodes 206(1) and 206(n) may be configured according to a disaster recovery configuration whereby a surviving node provides switchover access to the data storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the nodes 206(1)-206(n) can be configured based on another type of replication arrangement (e.g., to facilitate load sharing).

Additionally, while two nodes are illustrated in FIG. 2, any number of nodes or data storage apparatuses can be included in other examples in other types of configurations or arrangements.

As illustrated in the clustered network environment 200, nodes 206(1)-206(n) can include various functional components that coordinate to provide a distributed storage architecture. For example, the nodes 206(1)-206(n) can include network modules 214(1)-214(n) and disk modules 216(1)-216(n). Network modules 214(1)-214(n) can be configured to allow the nodes 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the nodes 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on nodes 206(1)-206(n), the data storage devices 210(1)-210(n) can appear as locally attached. In this manner, different nodes 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different nodes can have a different number of network and disk modules, and the same node computing device can have a different number of network modules than disk modules.

Further, one or more of the client devices 208(1)-208(n) can be networked with the nodes 206(1)-206(n) in the cluster, over the storage connections 212(1)-212(n). As an example, respective client devices 208(1)-208(n) that are networked to a cluster may request services (e.g., exchanging of information in the form of data packets) of nodes 206(1)-206(n) in the cluster, and the nodes 206(1)-206(n) can return results of the requested services to the client devices 208(1)-208(n). In one example, the client devices 208(1)-208(n) can exchange information with the network modules 214(1)-214(n) residing in the nodes 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example, volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the nodes 206(1)-206(n) connects to a volume, a connection between the one of the nodes 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
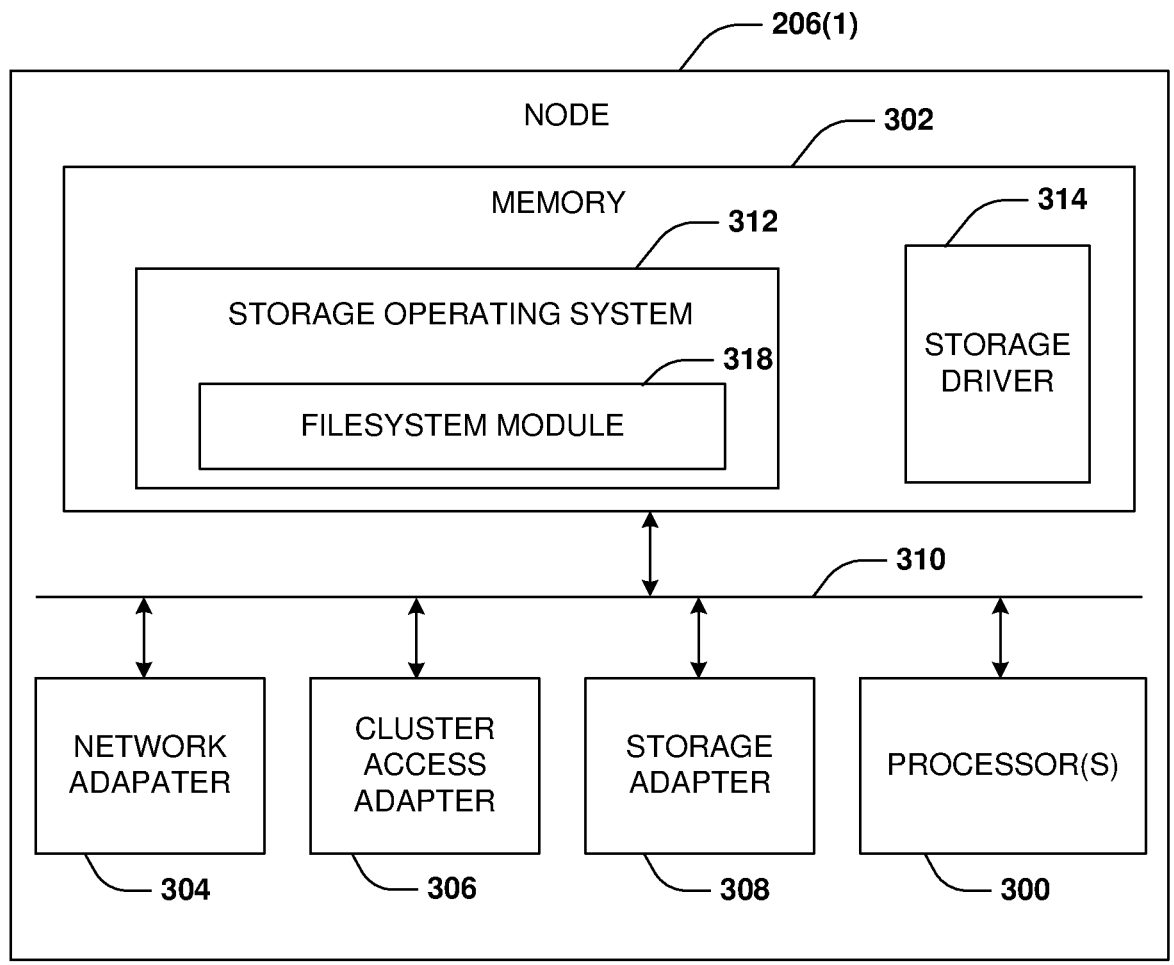
FIG. 3 is a block diagram illustrating an example of various components that may be present within a node that may be used in accordance with an embodiment of the invention.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g., a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
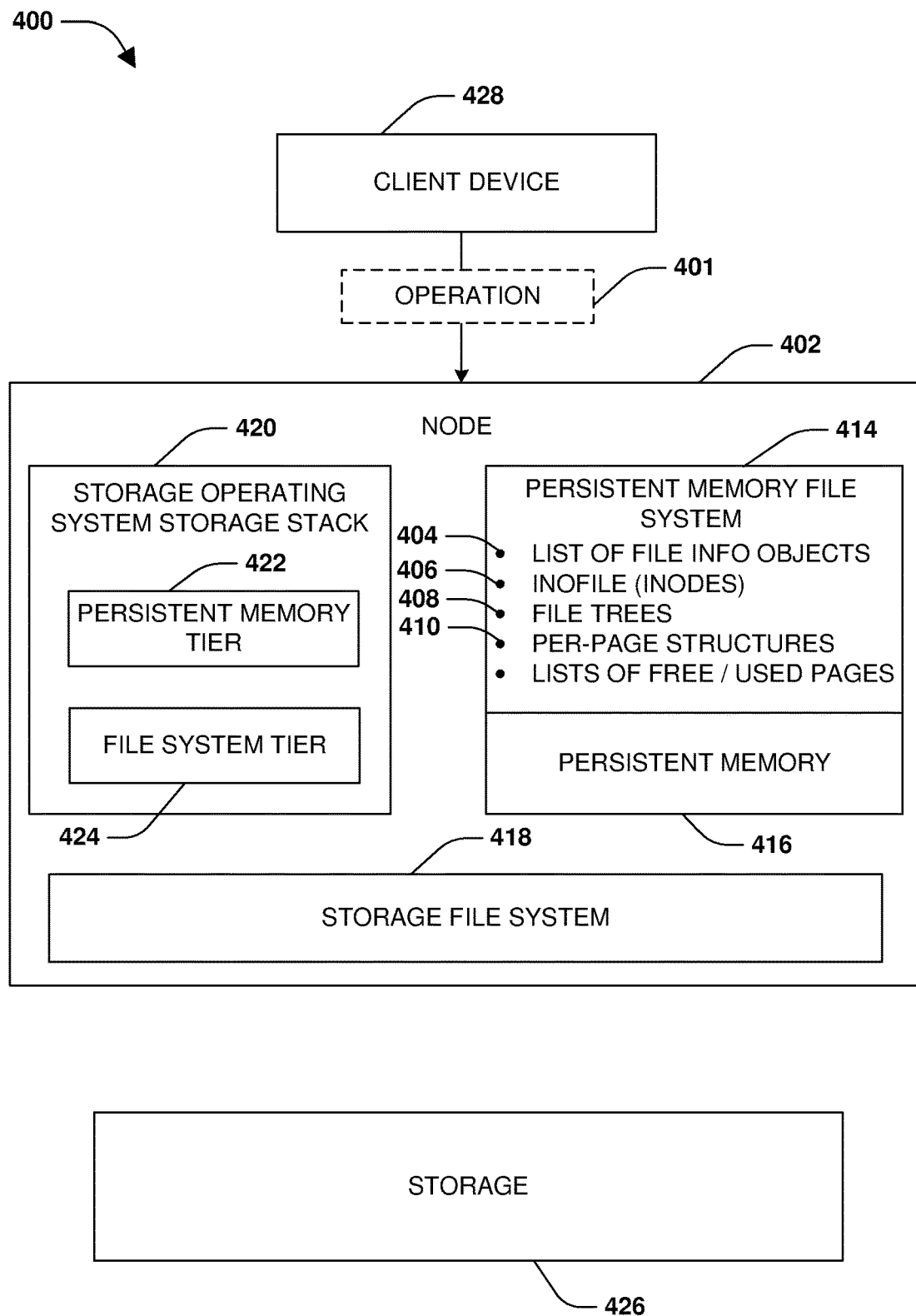
FIG. 4 is a block diagram illustrating an example of various components of system for implementing a persistent memory tier and a file system tier in accordance with an embodiment of the invention.

FIG. 4 illustrates a system 400 comprising node 402 that implements a file system tier 424 to manage storage 426 and a persistent memory tier 422 to manage persistent memory 416 of the node 402. The node 402 may comprise a server, an on-premise device, a virtual machine, computing resources of a cloud computing environment (e.g., a virtual machine hosted within the cloud), a computing device, hardware, software, or combination thereof. The node 402 may be configured to manage the storage and access of data on behalf of clients, such as a client device 428. The node 402 may host a storage operating system configured to store and manage data within and/or across various types of storage devices, such as locally attached storage, cloud storage, disk storage, flash storage, solid state drives, tape, hard disk drives, etc. For example, the storage operating system of the node 402 may store data within storage 426, which may be composed of one or more types of block-addressable storage (e.g., disk drive, a solid-state drive, etc.) or other types of storage. The data may be stored within storage objects, such as volumes, containers, logical unit numbers (LUNs), aggregates, cloud storage objects, etc. In an embodiment, an aggregate or other storage object may be comprised of physical storage of a single storage device or storage of multiple storage devices or storage providers.

The storage operating system of the node 402 may implement a storage file system 418 that manages the storage and client access of data within the storage objects stored within the storage 426 associated with the node 402. For example, the client device 428 may utilize the storage file system 418 in order to create, delete, organize, modify, and/or access files within directories of a volume managed by the storage file system 418. The storage operating system may be associated with a storage operating system storage stack 420 that comprises a plurality of levels through which operations, such as read and write operations from client devices, are processed. An operation may first be processed by a highest level tier (e.g., with lowest latency), and then down through lower level tiers (e.g., with higher latency) of the storage operating system storage stack 420 until reaching a lowest level tier of the storage operating system storage stack 420. The storage file system 418 may be managed by a file system tier 424 within the storage operating system storage stack 420. When an operation reaches the file system tier 424, the operation may be processed by the storage file system 418 for storage within the storage 426.

The storage file system 418 may be configured with commands, APIs, data structures (e.g., data structures used to identify block address locations of data within the storage 426), and/or other functionality (e.g., functionality to access certain block ranges within the storage 426) that is tailored to the block-addressable storage 426. Because the storage file system 418 is tailored for the block-addressable semantics of the storage 426, the storage file system 418 may be unable to utilize other types of storage that use a different addressing semantics such as persistent memory 416 that is byte-addressable.

The persistent memory 416 provides relatively lower latency and faster access speeds than the block-addressable storage 426 that the storage file system 418 is natively tailored to manage. Because the persistent memory 416 is byte-addressable instead of block-addressable, the storage file system 418, data structures of the storage file system 418 used to locate data according to block-addressable semantics of the storage 426, and the commands to store and retrieved data from the block-addressable storage 426 may not be able to be leveraged for the byte-addressable persistent memory 416.

Accordingly, a persistent memory file system 414 and the persistent memory tier 422 for managing the persistent memory file system 414 are implemented for the persistent memory 416 so that the node 402 can use the persistent memory file system 414 to access and manage the persistent memory 416 or other types of byte-addressable storage for storing user data. The persistent memory 416 may comprise memory that is persistent, such that data structures can be stored in a manner where the data structures can continue to be accessed using memory instructions and/or memory APIs even after the end of a process that created or last modified the data structures. The data structures and data will persist even in the event of a power loss, failure and reboot, etc.

The persistent memory 416 is non-volatile memory that has nearly the same speed and latency of DRAM and has the non-volatility of NAND flash. The persistent memory 416 could dramatically increase system performance of the node 402 compared to the higher latency and slower speeds of the block-addressable storage 426 accessible to the node 402 through the storage file system 418 using the file system tier 424 (e.g., hard disk drives, solid state storage, cloud storage, etc.). The persistent memory 416 is byte-addressable, and may be accessed through a memory controller. This provides faster and more fine-grained access to persistent storage within the persistent memory 416 compared to block-based access to the block-addressable storage 426 through the storage file system 418.

The persistent memory file system 414 implemented for the byte-addressable persistent memory 416 is different than the storage file system 418 implemented for the block-addressable storage 426. For example, the persistent memory file system 414 may comprise data structures and/or functionality tailored to byte-addressable semantics of the persistent memory 416 for accessing bytes of storage, which are different than data structures and functionality of the storage file system 418 that are tailored to block-addressable semantics of the storage 426 for accessing blocks of storage. Furthermore, the persistent memory file system 414 is tailored for the relatively faster access speeds and lower latency of the persistent memory 416, which improves the operation of the node 402 by allowing the node 402 to process I/O from client devices much faster using the persistent memory tier 422, the persistent memory file system 414, and the persistent memory 416.

In order to integrate the persistent memory 416 into the node 402 in a manner that allows client data of client devices, such as the client device 428, to be stored into and read from the persistent memory 416, the persistent memory tier 422 is implemented within the storage operating system storage stack 420 for managing the persistent memory 416. The persistent memory tier 422 is maintained at a higher level within the storage operating system storage stack 420 than the file system tier 424 used to manage the storage file system 418. The persistent memory tier 422 is maintained higher in the storage operating system storage stack 420 than the file system tier 424 so that operations received from client devices by the node 402 are processed by the persistent memory tier 422 before the file system tier 424 even though the operations may target the storage file system 418 managed by the file system tier 424. This occurs because higher levels within the storage operation system storage stack 420 process operations before lower levels within the storage operating system storage stack 420.

The persistent memory tier 422 may implement various APIs, functionality, data structures, metadata, and commands for the persistent memory file system 414 to access and/or manage the persistent memory 416. For example, the persistent memory tier 422 may implement APIs to access the persistent memory file system 414 of the persistent memory 416 for storing data into and/or retrieving data from the persistent memory 416 according to byte-addressable semantics of the persistent memory 416. The persistent memory tier 422 may implement functionality to determine when data should be tiered out from the persistent memory 416 to the storage 426 based upon the data becoming infrequently accessed, and thus cold.

The persistent memory file system 414 is configured with data structures and/or metadata for tracking and locating data within the persistent memory 416 according to the byte-addressable semantics. For example, the persistent memory file system 414 indexes the persistent memory 416 of the node 402 as an array of pages (e.g., 4 kb pages) indexed by page block numbers. One of the pages, such as a page (1), comprises a file system superblock that is a root of a file system tree (a buffer tree) of the persistent memory file system 414. A duplicate copy of the file system superblock may be maintained within another page of the persistent memory 416 (e.g., a last page, a second to last page, a page that is a threshold number of indexed pages away from page (1), etc.). The file system superblock comprises a location of a list of file system info objects 404.

The list of file system info objects 404 comprises a linked list of pages, where each page contains a set of file system info objects. If there are more file system info objects than what can be stored within a page, then additional pages may be used to store the remaining file system info objects and each page will have a location of the next page of file system info objects. In this way, a plurality of file system info objects can be stored within a page of the persistent memory 416. Each file system info object defines a file system instance for a volume and snapshot (e.g., a first file system info object correspond to an active file system of the volume, a second file system info object may correspond to a first snapshot of the volume, a third file system info object may correspond to a second snapshot of the volume, etc.). Each file system info object comprises a location within the persistent memory 416 of an inofile (e.g., a root of a page tree of the inofile) comprising inodes of a file system instance.

An inofile 406 of the file system instance comprises an inode for each file within the file system instance. An inode of a file comprises metadata about the file. Each inode stores a location of a root of a file tree for a given file. In particular, the persistent memory file system 414 maintains file trees 408, where each file is represented by a file tree of indirect pages (intermediate nodes of the file tree) and direct blocks (leaf nodes of the file tree). The direct blocks are located in a bottom level of the file tree, and one or more levels of indirect pages are located above the bottom level of the file tree. The indirect pages of a particular level comprise references to blocks in a next level down within the file tree (e.g., a reference comprising a page block number of a next level down node or a reference comprising a per-page structure ID of a per-page structure having the page block number of the next level down node). Direct blocks are located at a lowest level in the file tree and comprise user data. Thus, a file tree for a file may be traversed by the persistent memory file system 414 using a byte range (e.g., a byte range specified by an I/O operation) mapped to a page index of a page (e.g., a 4k offset) comprising the data within the file to be accessed.

The persistent memory file system 414 may maintain other data structures and/or metadata used to track and locate data within the persistent memory 416. In an embodiment, the persistent memory file system 414 maintains per-page structures 410. A per-page structure is used to track metadata about each page within the persistent memory 416. Each page will correspond to a single per-page structure that comprises metadata about the page. In an embodiment, the per-page structures are stored in an array within the persistent memory 416. The per-page structures correspond to file system superblock pages, file system info pages, indirect pages of the inofile 406, user data pages within the file trees 408, per-page structure array pages, etc.

In an embodiment of implementing per-page structure to page mappings using a one-to-one mapping, a per-page structure for a page can be fixed at a page block number offset within a per-page structure table. In an embodiment of implementing per-page structure to page mappings using a variable mapping, a per-page structure of a page stores a page block number of the page represented by the per-page structure. With the variable mapping, persistent memory objects (e.g., objects stored within the file system superblock to point to the list of file system info objects; objects within a file system info object to point to the root of the inofile; objects within an inode to point to a root of a file tree of a file; and objects within indirect pages to point to child blocks (child pages)) will store a per-page structure ID of its per-page structure as a location of a child page being pointed to, and will redirect through the per-page structure using the per-page structure ID to identify the physical block number of the child page being pointed to. Thus, an indirect entry of an indirect page will comprise a per-page structure ID that can be used to identify a per-page structure having a physical block number of the page child pointed to by the indirect page.

The persistent memory tier 422 may implement functionality to utilize a policy to determine whether certain operations should be redirected to the persistent memory file system 414 and the persistent memory 416 or to the storage file system 418 and the storage 426 (e.g., if a write operation targets a file that the policy predicts will be accessed again, such as accessed within a threshold timespan or accessed above a certain frequency, then the write operation will be retargeted to the persistent memory 416). For example, the node 402 may receive an operation from the client device 428.

The operation may be processed by the storage operating system using the storage operating system storage stack 420 from a highest level down through lower levels of the storage operating system storage stack 420. Because the persistent memory tier 422 is at a higher level within the storage operating system storage stack 420 than the file system tier 424, the operation is intercepted by the persistent memory tier 422 before reaching the file system tier 424. The operation is intercepted by the persistent memory tier 422 before reaching the file system tier 424 even though the operation may target the storage file system 418 managed by the file system tier 424. This is because the persistent memory tier 422 is higher in the storage operating system storage stack 420 than the file system tier 424, and operations are processed by higher levels before lower levels within the storage operating system storage stack 420.

Accordingly, the operation is intercepted by the persistent memory tier 422 within the storage operating system storage stack 420. The persistent memory tier 422 may determine whether the operation is to be retargeted to the persistent memory file system 414 and the persistent memory 416 or whether the operation is to be transmitted (e.g., released to lower tiers within the storage operating system storage stack 420) by the persistent memory tier 422 to the file system tier 424 for processing by the storage file system 418 utilizing the storage 426. In this way, the tiers within the storage operating system storage stack 420 are used to determine how to route and process operations utilizing the persistent memory 416 and/or the storage 426.

In an embodiment, an operation 401 is received by the node 402. The operation 401 may comprise a file identifier of a file to be accessed. The operation 401 may comprise file system instance information, such as a volume identifier of a volume to be accessed and/or a snapshot identifier of a snapshot of the volume to be accessed. If an active file system of the volume is to be accessed, then the snapshot identifier may be empty, null, missing, comprising a zero value, or otherwise comprising an indicator that no snapshot is to be accessed. The operation 401 may comprise a byte range of the file to be accessed.

The list of file system info objects 404 is evaluated using the file system information to identify a file system info object matching the file system instance information. That is, the file system info object may correspond to an instance of the volume (e.g., the active file system of the volume or a snapshot identified by the snapshot identifier of the volume identified by the volume identifier within the operation 401) being targeted by the operation 401, which is referred to as an instance of a file system or a file system instance. In an embodiment of the list of file system info objects 404, the list of file system info objects 404 is maintained as a linked list of entries. Each entry corresponds to a file system info object, and comprises a volume identifier and a snapshot identifier of the file system info object. In response to the list of file system info objects 404 not comprising any file system info objects that match the file system instance information, the operation 401 is routed to the file system tier 424 for execution by the storage file system 418 upon the block-addressable storage 426 because the file system instance is not tiered into the persistent memory 416. However, if the file system info object matching the file system instance information is found, then the file system info object is evaluated to identify an inofile such as the inofile 406 as comprising inodes representing files of the file system instance targeted by the operation 401.

The inofile 406 is traversed to identify an inode matching the file identifier specified by the operation 401. The inofile 406 may be represented as a page tree having levels of indirect pages (intermediate nodes of the page tree) pointing to blocks within lower levels (e.g., a root points to level 2 indirect pages, the level 2 indirect pages point to level 1 indirect pages, and the level 1 indirect pages point to level 0 direct blocks). The page tree has a bottom level (level 0) of direct blocks (leaf nodes of the page tree) corresponding to the inodes of the file. In this way, the indirect pages within the inofile 406 are traversed down until a direct block corresponding to an inode having the file identifier of the file targeted by the operation 401 is located.

The inode may be utilized by the persistent memory file system 414 to facilitate execution of the operation 401 by the persistent memory tier 422 upon the persistent memory 416 in response to the inode comprising an indicator (e.g., a flag, a bit, etc.) specifying that the file is tiered into the persistent memory 416 of the node 402. If the indicator specifies that the file is not tiered into the persistent memory 416 of the node 402, then the operation 401 is routed to the file system tier 424 for execution by the storage file system 418 upon the block-addressable storage 426.

In an embodiment where the operation 401 is a read operation and the inode comprises an indicator that the file is tiered into the persistent memory 416, the inode is evaluated to identify a pointer to a file tree of the file. The file tree may comprise indirect pages (intermediate nodes of the file tree comprising references to lower nodes within the file tree) and direct blocks (leaf nodes of the file tree comprising user data of the file). The file tree may be traversed down through levels of the indirect pages to a bottom level of direct blocks in order to locate one or more direct blocks corresponding to pages within the persistent memory 416 comprising data to be read by the read operation (e.g., a direct block corresponding to the byte range specified by the operation 401). That is, the file tree may be traversed to identify data within one or more pages of the persistent memory 416 targeted by the read operation. The traversal utilizes the byte range specified by the read operation. The byte range is mapped to a page index of a page (e.g., a 4 kb offset) of the data within the file to be accessed by the read operation. In an embodiment, the file tree is traversed to determine whether the byte range is present within the persistent memory 416. If the byte range is present, then the read operation is executed upon the byte range. If the byte range is not present, then the read operation is routed to the file system tier 424 for execution by the storage file system 418 upon the block-based storage 426 because the byte range to be read is not stored within the persistent memory 416. If a portion of the byte range is present within the persistent memory 416, then the remaining portion of the byte range is retrieved from the storage 426.

In an embodiment where the operation 401 is a write operation, access pattern history of the file (e.g., how frequently and recently the file has been accessed) is evaluated in order to determine whether the execute the write operation upon the persistent memory 416 or to route the write operation to the file system tier 424 for execution by the storage file system 418 upon the block-addressable storage 426. In this way, operations are selectively redirected by the persistent memory tier 422 to the persistent memory file system 414 for execution upon the byte-addressable persistent memory 416 or routed to the file system tier 424 for execution by the storage file system 418 upon the block-addressable storage 426 based upon the access pattern history (e.g., write operations targeting more frequently or recently accessed data/files may be executed against the persistent memory 416).

Figure 5:
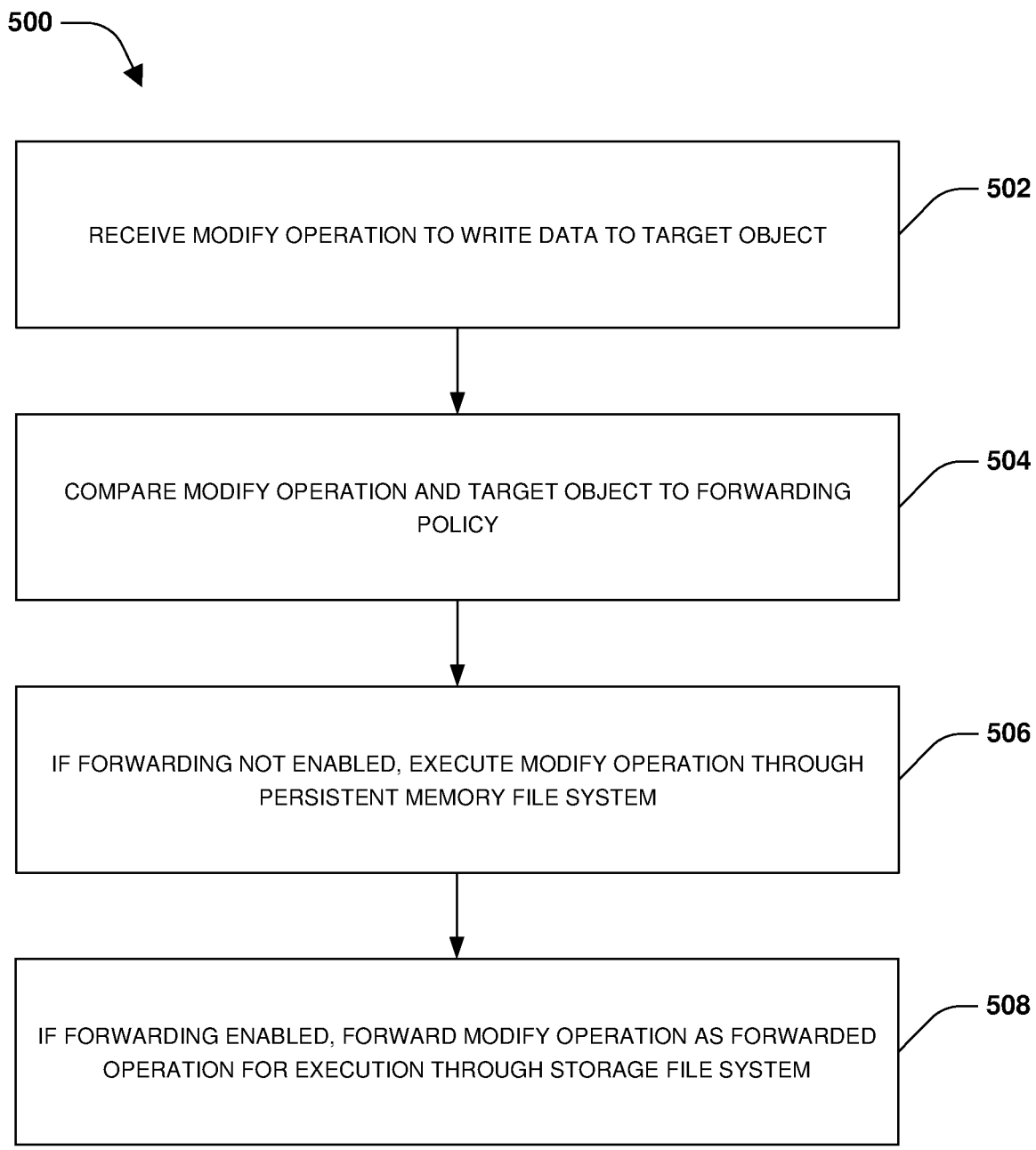
FIG. 5 is a flow chart illustrating an example of a set of operations that support forwarding of operations to bypass persistent memory in accordance with an embodiment of the invention.
Figure 6:
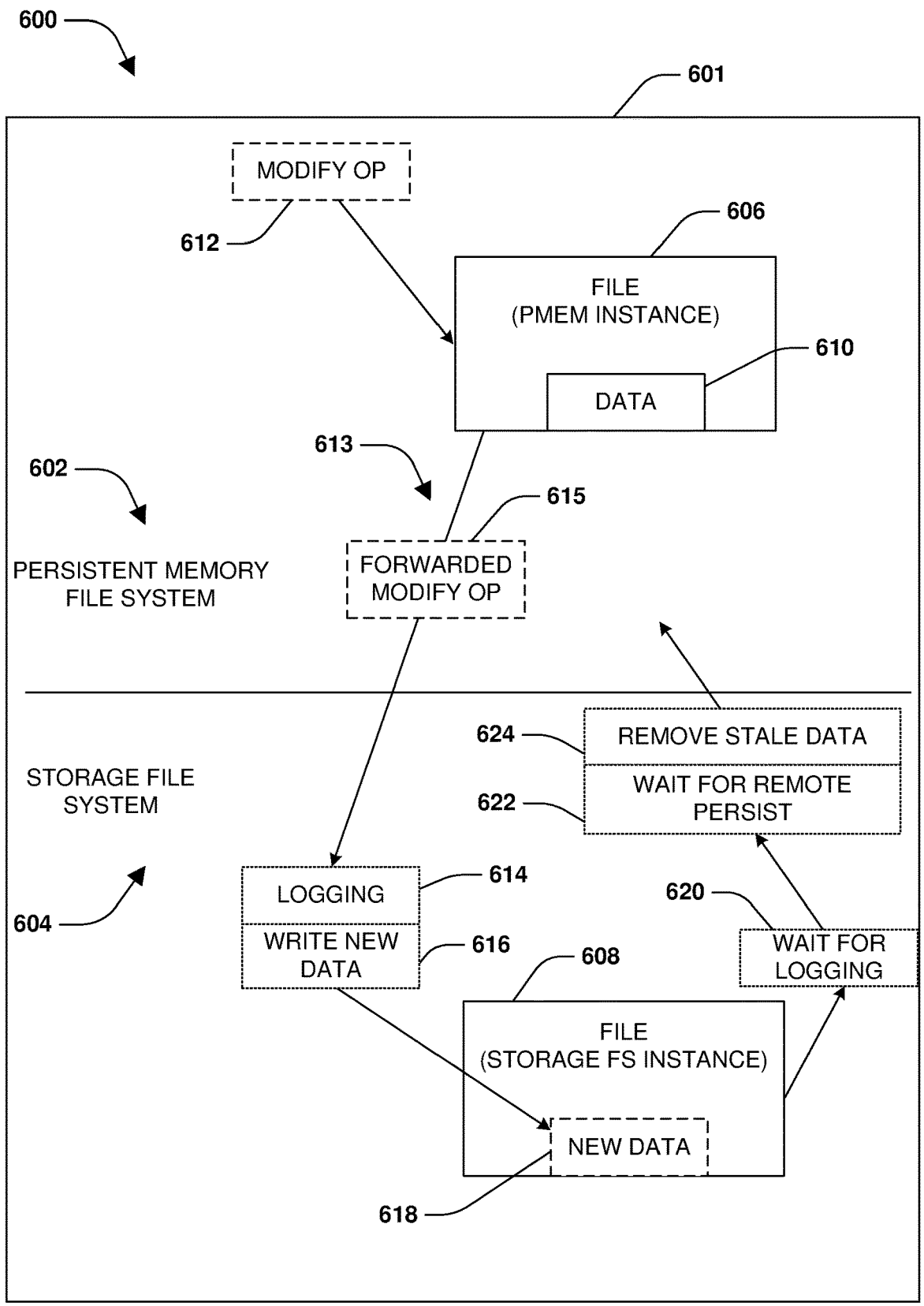
FIG. 6 is a block diagram illustrating an example of supporting the forwarding of operations to bypass persistent memory in accordance with an embodiment of the invention.

One embodiment of forwarding operations to bypass persistent memory is illustrated by an exemplary method 500 of FIG. 5 and further described in conjunction with system 600 of FIG. 6. The system 600 may comprise a node 601. The node 601 may comprise a persistent memory tier associated with persistent memory of the node 601 and a file system tier associated with storage managed by the node 601, similar to node 402 of FIG. 4. The node 601 may implement a persistent memory file system 602 used to store, organize, and provide access to data within the persistent memory. The node 601 may implement a storage file system 604 to store, organize, and provide access to data within the storage managed by the node 601.

In some embodiments, the node 601 may expose a single file system of a storage object (e.g., a volume, an aggregate, etc.) to a client, whose data is stored across the persistent memory through the persistent memory file system 602 and the storage through the storage file system 604. For example, the node 601 may expose a volume to a client device. Data blocks within the storage of the storage file system 604 may be allocated for the volume. At least some corresponding data blocks may be allocated within pages of the persistent memory by the persistent memory file system 602. Some of the data within the storage of the storage file system 604 may be copied (tiered) into the persistent memory, and thus two instances of the data are stored across the storage by the storage file system 604 and the persistent memory by the persistent memory file system 602. Because the persistent memory provides lower latency than the storage of the storage file system 604, operations targeting the volume may be intercepted by the persistent memory tier before reaching the file system tier. Instead of these operations being implemented by the storage file system 604 upon the storage, the operations may be implemented by the persistent memory file system 602 so that client experienced latency is reduced.

As operations are executed by the persistent memory file system 602 upon the persistent memory, data within blocks of the persistent memory may diverge from data within corresponding blocks of the storage of the storage file system 604. Accordingly, framing may be performed by the persistent memory tier to notify the file system tier of blocks within the persistent memory that comprise more up-to-date data than corresponding blocks in the storage of the storage file system 604. In this way, the more up-to-date data may be copied from the persistent memory to the storage of the storage file system 604 and/or certain operations such as snapshot operations or file clone operations may be execute in a manner where the more up-to-date data in the persistent memory will be targeted by such operations as opposed to corresponding stale data within the storage of the storage file system 604.

Because these operations are executed upon the persistent memory by the persistent memory file system 602 and are not executed by the storage file system 604 upon the storage, an authoritative copy of data is maintained within the persistent memory by the persistent memory file system 602.

In some instances, certain operations may be more efficient to execute through the storage file system 604 upon the storage, as opposed to being executed through the persistent memory file system 602 upon the persistent memory. Such operations may correspond to hole punch operations that free unused blocks of data, partial write operations (e.g., a write to less than a 4 kb block of data, such as where data is appended to an end of file of a file), multi-block sequential write operations, and/or certain operations targeting non-tiered data that has not been copied from the storage to the persistent memory. It may be advantageous to forward these operations to the storage file system 604 for execution upon the storage and to bypass the persistent memory file system 602. This improves the efficiency of executing these operations because the file system tier may more efficiently handle these operation without additional complexity that would otherwise be associated with the persistent memory tier handling these operations. This also ensures file system correctness across the persistent memory file system 602 and the storage file system 604.

Accordingly, as provided herein, forwarding of operations that bypass the persistent memory file system 602 and are executed by the storage file system 604 upon the storage may be implemented in a manner that ensures that the authoritative copy of data is to be maintained within the persistent memory by the persistent memory file system 602 by removing stale data from the persistent memory. One or more forwarding policies may be defined for when to enable or disable forwarding of operations to the storage file system 604.

In some embodiments, a forwarding policy may be defined according to a window based forwarding mode for a particular file system object, such as a volume or inode of a file. The forwarding policy may be defined to enable the forwarding of modify operations that target the file system object until a forwarding duration timespan of a forwarding duration window ends. Modify operations, targeting the file system object during the forward duration window and/or satisfying certain criteria, are forwarded to the storage file system 604 for execution upon an instance of the file system object within the storage of the storage file system 604. These forwarded operations will bypass being executed by the persistent memory file system 602 upon an instance of the file system object within the persistent memory. In an example where the forwarding policy is implemented during a duration of a snapshot being created by a snapshot creation operation, the criteria may indicate that modify operations that would increase a dirty backlog of data to process by the snapshot creation operation are to be forwarded. In some embodiments, the forward duration window may correspond to a particular amount of time, a timespan corresponding to execution of an operation (e.g., the forward duration window is in effect until a snapshot operation, a file clone operation, or some other operation completes), or a triggering event occurs.

In some embodiments, if a modify operation has been forwarded to the storage file system 604 for execution upon the storage of the storage file system 604 and the forwarding duration timespan has ended after the modify operation being forwarded as the forwarded operation, then the execution of the forwarded operation is completed through the storage file system 604 notwithstanding the forwarding duration timespan ending. Once the forwarding duration timespan ends, new incoming operations may be accepted through the persistent memory tier for potential execution through the persistent memory file system 602 upon the persistent memory.

In some embodiments, a forwarding policy may be defined according to a file block number forwarding mode. Instead of having an established forward duration window, any modify operations satisfying a predefined policy are forwarded. In some embodiments, the predefined policy may correspond to operations having a hole punch operation type (e.g., an operation to free an unused block) or a partial write operation type (e.g., an operation writing to a portion of a 4 kb block). In some embodiments, the predefined policy may correspond to operations that target non-tiered blocks not maintained within the persistent memory file system 602. This is because the non-tiered blocks are located within block instances of the storage of the storage file system 604 and there are no corresponding block instances of the non-tiered blocks within the persistent memory of the persistent memory file system 602. In some embodiments, the predefined policy may correspond to modify operations having a multi-block sequential write operation type that would be more efficient to execute through the storage file system 604 as opposed to through the persistent memory file system 602. Forwarding of these types of operations may improve performance because such operations can be more efficiently handled by a storage system layer associated with the storage file system 604 and/or because execution of these operations through the storage file system 604 is more simple and avoids complex interactions that must be dealt with to ensure correctness if these operations were otherwise executed by the persistent memory file system 602.

During operation 502 of method 500 of FIG. 5, a modify operation 612 to write new data 618 to a target object may be received by the node 601. In an example, the target object may correspond to a persistent memory instance of a file 606 stored within the persistent memory by the persistent memory file system 602 and may also correspond to a storage file system instance of the file 608 stored within the storage by the storage file system 604. The persistent memory instance of the file 606 may currently store data 610, which is deemed to be the authoritative copy of the target object due to the invariant.

During operation 504 of method 500 of FIG. 5, the modify operation 612 and the target object may be compared to a forwarding policy to determine whether forwarding is enabled for the modify operation 612 and the target object or whether forwarding is not enabled for the modify operation 612 and the target object. During operation 506 of method 500 of FIG. 5, a determination may be made that the forwarding policy indicates that forwarding is not enabled for the modify operation 612 and the target object (e.g., a forwarding duration timespan has ended or forwarding is not enabled for the particular target object or operation type of the modify operation 612). Accordingly, the modify operation 612 may be executed through the persistent memory file system 602 upon the persistent memory instance of the file 606 to write the new data 618 to the persistent memory instance of the file 606, which is not illustrated by FIG. 6.

During operation 508 of method 500 of FIG. 5, a determination may be made that the forwarding policy indicates that forwarding is enabled for the modify operation 612 and the target object. Accordingly, the modify operation 612 is forwarded 613 to the storage file system 604 as a forwarded modify operation 615 for execution upon the storage file system instance of the file 608 and bypasses execution by the persistent memory file system 602 upon the persistent memory instance of the file 606, as illustrated by FIG. 6. When the storage file system 604 receives the forwarded modify operation 615, the forwarded modify operation 615 is logged 614 into a log, such as being logged into a non-volatile log (NVLog) of the node 601.

The new data 618 to be written by the forwarded modify operation 615 is written 616 to the storage file system instance of the file 608. Once the logging is complete 620, a remote direct memory access transfer is performed. The remote direct memory access transfer transmits an indication to a partner node that is a partner of the node 601 that the new data 618 has been written into the storage file system instance of the file 608, and that the data 610 within the persistent memory instance of the file 606 is stale and will be removed from the persistent memory. The remote direct memory access transfer is performed because the partner node maintains a mirrored copy of the data that the node 601 maintains within the storage of the storage file system 604 and within the persistent memory of the persistent memory file system 602. Thus, in the event the node 601 fails and the partner node is to take over the processing of operations in place of the failed node 601, the partner node will have up-to-date mirrored data because the partner node has or knows to remove corresponding data from a partner persistent memory of the partner node so that the partner persistent memory of the partner node mirrors the persistent memory of the node 601.

In some embodiments, once the remote direct memory access transfer completes 622 and the logging completes 620, the data 610 within the persistent memory instance of the file 606 is removed 624 because the data 610 is stale since the new data 618 is now stored within the storage file system instance of the file 608 and not within the persistent memory instance of the file 606. In some embodiments, the data 610 within the persistent memory instance of the file 606 that is stale may be removed before or during the forwarding 613 of the modify operation 612 as the forwarded modify operation 615. Removing the data 610 within the persistent memory instance of the file 606 that is stale preserves the invariant that the persistent memory file system 602 is to maintain the authoritative copy of data that has been copied (tiered) into the persistent memory because the data 610 of the target object is no longer tiered into the persistent memory and has been removed from the persistent memory. Once the data 610 within the persistent memory instance of the file 606 that is stale has been removed from the persistent memory, the modify operation 612 may be acknowledged as complete to a client that issued the modify operation 612 to the node 601.

In some embodiments of determining whether to forward a modify operation, a determination may be made that the modify operation spans a plurality of file system objects (e.g., multiple inode of files). If a subset of the plurality of objects satisfies the forwarding policy to enable forwarding, then forwarding is performed for the entirety of the modify operation with respect to the plurality of file system objects even though some of the plurality of file system objects may not satisfy the forwarding policy to enable forwarding on their own.

Forwarding of operations may have certain interactions with consistency point operations being implemented by the node 601, and thus are handled in particular manner to ensure file system consistency and ensure there is no data loss. Certain modify operations, such as forwarded operations, may make changes to both the file system tier (the storage system layer) such as by writing the new data 618 into the storage file system instance of the file 608 and the persistent memory tier such as by removing the data 610 from the persistent memory instance of the file 606 that is now stale. A consistency point operation is performed to formally accept these modifications, such as by storing the new data 618 to a storage device (flushing to disk).

Once the consistency point operation stores the modifications to the file system tier (e.g., modifications to data within the storage of the storage file system 604) to the storage device, the modifications, such as the new data 618, become part of the storage file system 604 of the file system tier. In some embodiments, the consistency point operation is performed by the node 601 and the partner node so that the modifications become part of the storage file system 604 of the node 601 and a partner storage file system of the partner node. However, if these modifications are committed to the storage file system 604 and the partner storage file system, but the corresponding persistent memory tier changes such as the removal of stale data are left out-of-sync and a crash occurs, then the overall file system may become corrupt because. This is because only modifications to the storage file systems were implemented by both the node 601 and the partner node, but the modifications to the persistent memory file systems were not implemented by both the node 601 and the partner node. Accordingly, to ensure a crash does not leave the overall file system corrupt, prior to the file system tier committing a modification (e.g., performing a consistency point operation to commit the modification such as to write the new data 618 to a storage device), the corresponding modifications to the persistent memory tiers (e.g., removal of stale data, such as the data 610) between the node 601 and the partner node are first synchronized.

In some embodiments of synchronizing the changes to the persistent memory tiers of the node 601 and the partner node, the node 601 may be blocked from implementing a consistency point to flush data from the storage file system 604 such as the new data 618 to the storage device until pending remote direct memory access transfers from the node 601 to the partner node are complete. The remote direct memory access transfers are performed to synchronize the modifications to the persistent memory tiers between the node 601 and the partner node. Once the pending remote direct memory access transfers are complete and the modifications to the persistent memory tiers between the node 601 and the partner node are synchronized, the consistency point may be implemented to commit the changes to the file system tier, such as to store the new data 618 to the storage of the storage file system 604. In order to track the pending remote direct memory access transfers from the node 601 to the partner node, a counter may be maintained to track a count of the pending remote direct memory access transfers. Implementation of the consistency point operation may be blocked until the count indicates that there are no pending remote direct memory access transfers relevant to the consistency point of what modifications are being flushed to the storage of the storage file system.

Figure 7:
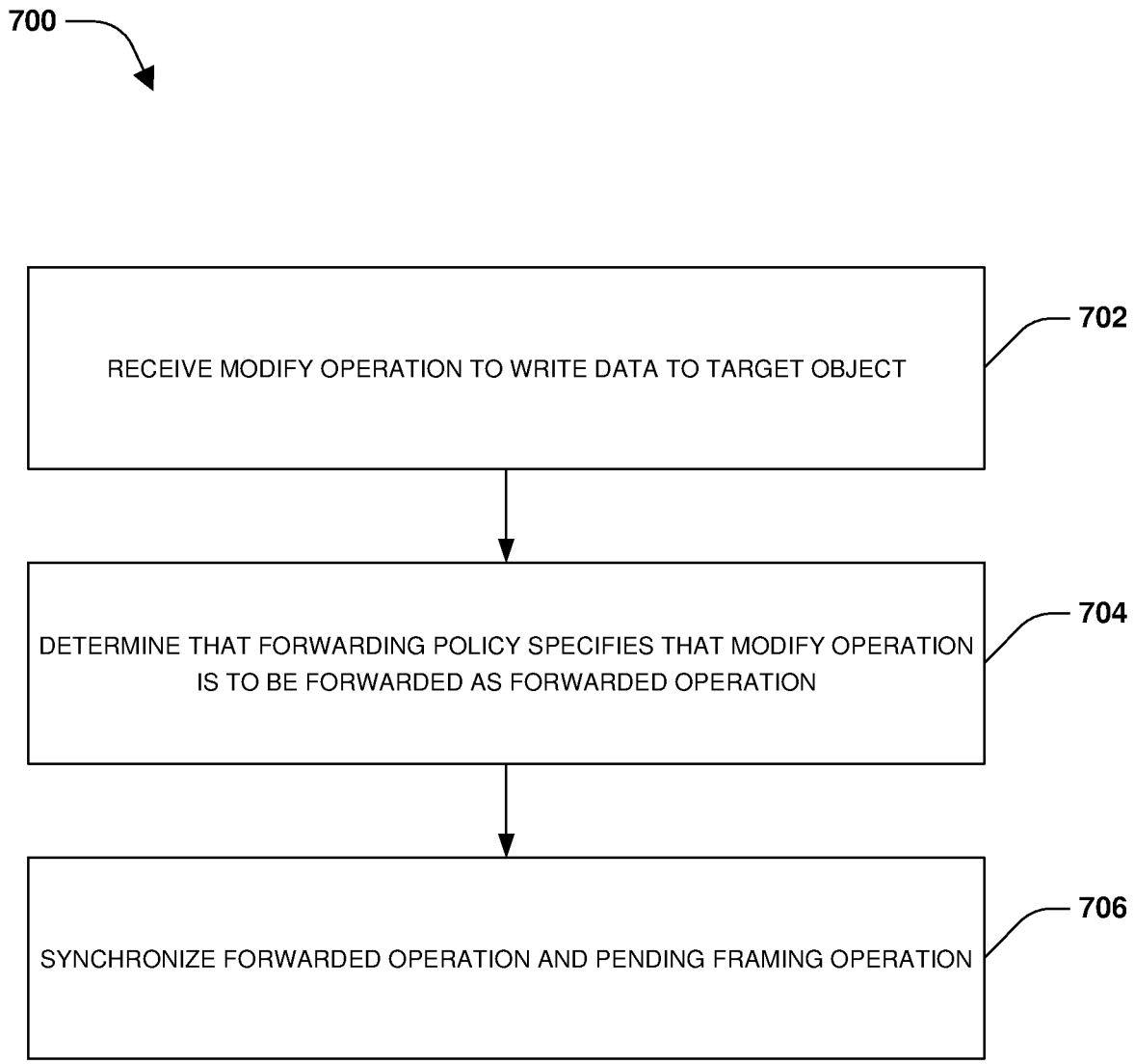
FIG. 7 is a flow chart illustrating an example of a set of operations that support forwarding of operations to bypass persistent memory in accordance with an embodiment of the invention.
Figure 8:
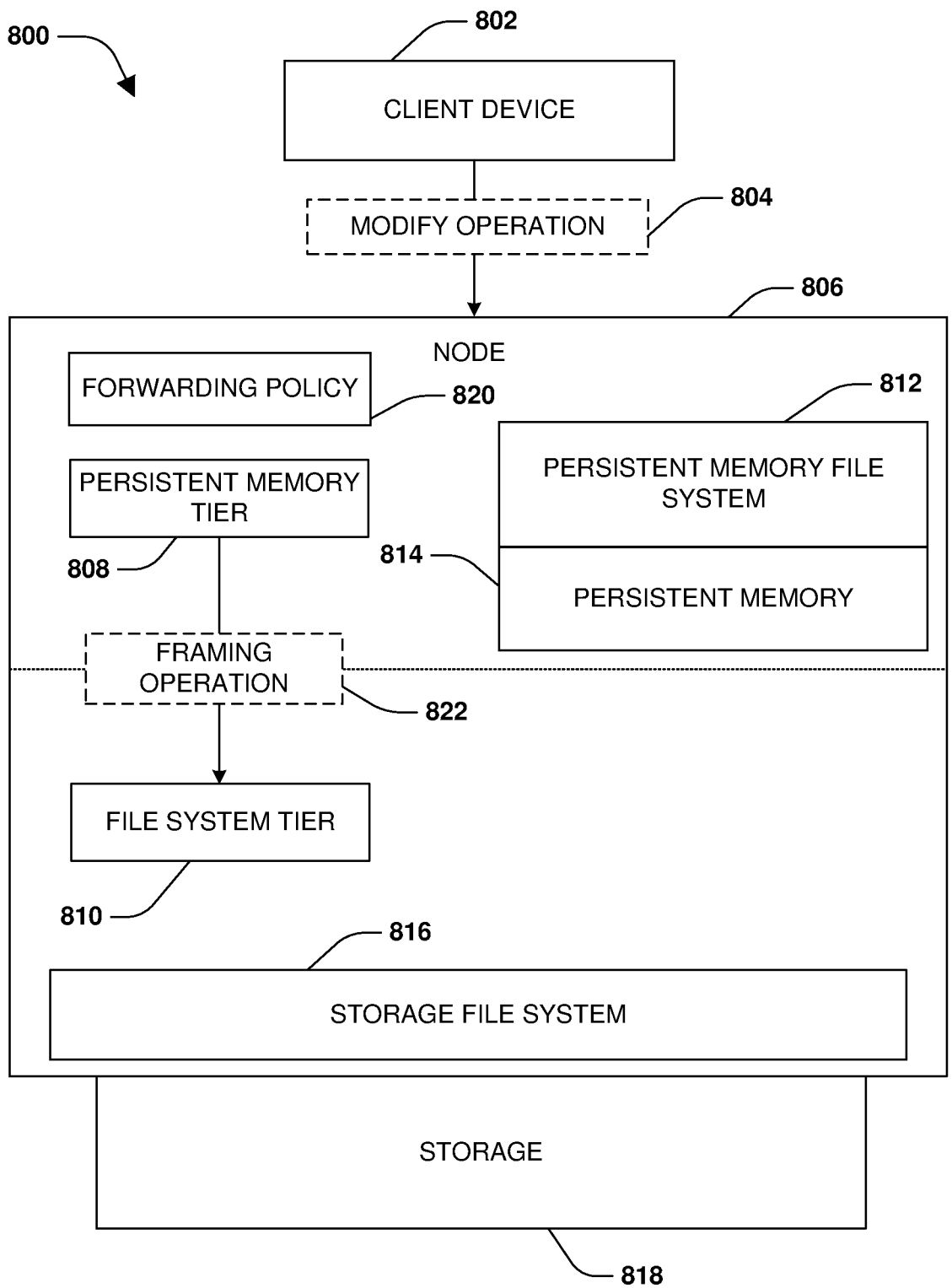
FIG. 8 is a block diagram illustrating an example of supporting the forwarding of operations to bypass persistent memory in accordance with an embodiment of the invention.

One embodiment of forwarding operations to bypass persistent memory is illustrated by an exemplary method 700 of FIG. 7 and further described in conjunction with system 800 of FIG. 8. The system 800 may comprise a node 806. The node 806 may comprise a persistent memory tier 808 associated with persistent memory 814 of the node 806 and a file system tier 810 associated with storage 818 managed by the node 806, similar to node 402 of FIG. 4 and/or node 601 of FIG. 6. The node 806 may implement a persistent memory file system 812 used to store, organize, and provide access to data within the persistent memory 814. The node 806 may implement a storage file system 816 to store, organize, and provide access to data within the storage 818 managed by the node 806.

In some embodiments, the node 806 may expose a single file system of a storage object (e.g., a volume, an aggregate, etc.) to a client device 802, which is stored across the persistent memory 814 through the persistent memory file system 812 and the storage 818 through the storage file system 816. For example, the node 806 may expose a volume to the client device 802. Data blocks within the storage 818 of the storage file system 816 may be allocated for the volume. At least some corresponding data blocks may be allocated within pages of the persistent memory 814 by the persistent memory file system 812.

Some of the data within the storage 818 of the storage file system 816 may be copied (tiered) into the persistent memory 814, and thus two instances of the data are stored across the storage 818 by the storage file system 816 and the persistent memory 814 by the persistent memory file system 812. Because the persistent memory 814 provides lower latency than the storage 818 of the storage file system 816, operations targeting the volume may be intercepted by the persistent memory tier 808 before reaching the file system tier 810. Instead of these operations being implemented by the storage file system 816 upon the storage 818, the operations may be implemented by the persistent memory file system 812 so that client experienced latency is reduced.

As operations are executed by the persistent memory file system 812 upon the persistent memory 814, data within blocks of the persistent memory 814 may diverge from data within corresponding blocks of the storage 818 of the storage file system 816. Accordingly, framing may be performed by the persistent memory tier 808 to notify the file system tier 810 of blocks within the persistent memory 814 that comprise more up-to-date data than corresponding blocks in the storage 818 of the storage file system 816. For example, a framing technique may be performed to identify block within pages of the persistent memory 814 that comprise more up-to-date data than corresponding blocks within the storage 818 of the storage file system 816.

Framing operations, such as framing operation 822, may be transmitted to the file system tier 810 to notify the file system tier 810 that the corresponding blocks of the storage file system 816 within the storage 818 are stale. The framing operations may comprise file block numbers of the blocks within the pages of the persistent memory 814 that comprise the more up-to-date data. In this way, the file system tier 810 may use the file block numbers to reference and/or retrieve the blocks within the pages of the persistent memory 814, such as to overwrite the corresponding blocks in the storage 818 of the storage file system 816 with the more up-to-date data or to implement various storage operations such as snapshot operations or file clone operations that can use the file block numbers to access the more up-to-date data to include with a snapshot or a file clone.

During operation 702 of method 700 of FIG. 7, the node 806 may receive a modify operation 804 from the client device 802 at the persistent memory tier 808. The modify operation 804 may be directed a target object to which the modify operation 804 is to write data. An instance of the target object may be maintained in the persistent memory 814 through the persistent memory file system 812 and/or a corresponding instance of the target object may be maintained in the storage 818 by the storage file system 816.

During operation 704 of method 700 of FIG. 7, the modify operation 804 and the target object may be compared with a forwarding policy 820 to determine whether forwarding is enabled for the modify operation 804 and the target object or is not enabled for the modify operation 804 and the target object. In response to determining that the forwarding policy 820 specifies that forwarding is enabled for the modify operation 804 and the target object, the modify operation 804 may be forwarded as a forwarded operation to the file system tier 810 for execution through the storage file system 816 upon the corresponding instance of the target object within the storage 818.

During operation 706 of method 700 of FIG. 7, a determination may be made that there is a pending framing operation such as the framing operation 822 that is pending to notify the file system tier 810 that the instance of the target object within the persistent memory 814 of the persistent memory file system 812 comprises more up-to-date data than the corresponding instance of the target object within the storage 818 of the storage file system 816. Accordingly, the forwarded operation that is to write new data to the corresponding instance of the target object within the storage 818 of the storage file system 816 and the pending framing operation that is to notify the file system tier 810 that the instance of the target object within the persistent memory 814 of the persistent memory file system 812 comprises more up-to-date data are synchronized so that data loss and/or file system inconsistency does not occur. Otherwise, data loss and/or file system inconsistency could occur such as where the forwarded operation is executed to write the new data to the corresponding instance of the target object within the storage 818 (making the up-to-date data within the persistent memory 814 now stale data), and then the pending framing operation is performed such that the now stale data may be retrieved and used to overwrite the new data because the pending framing operation incorrectly indicated that the target object within the persistent memory 814 of the persistent memory file system 812 comprises the more up-to-date data, but actually does not.

In some embodiments of synchronizing the pending framing operation and the forwarded operation, a determination is made as to whether to suspend the forwarded operation (e.g., so that the forwarded operation can be executed after the pending framing operation to ensure the new data of the forwarded operation is understood to be the more up-to-date version of the data) or to cause the pending framing operation to skip the target object (e.g., so that only the forwarded operation is executed to ensure that the new data of the forwarded operation is understood to be the more up-to-date version of the data). The synchronization may be performed based upon certain internal states and/or conditions. In an example, in order to perform the synchronization, internal states, such as metadata, may be maintained within an object, such as by storing the internal states within a memory in a buffer header for the object (e.g., an internal state may be associated with a bit mask within a buffer header associated with the object). This memory may be used to track various internal states, and can be used to perform the synchronization. In some embodiments, the internal states and/or conditions correspond to phases through which a block moves as the block is stored to persistent storage. These phases corresponds to state transitions of the block as the block makes its way to the persistent storage, and are tracked as internal states representing how far along the block is in making its way to the persistent storage. This state transition data may be stored within metadata maintained within memory, such as within a buffer header.

In some embodiments of performing the synchronization, the forwarded operation may be suspended for subsequent execution after the pending framing operation based upon a determination that the pending framing operation is directed to (e.g., currently processing) a subset of file block numbers targeted by the forwarded operation. In some embodiments of performing the synchronization, execution of the framing operation 822 may be modified to skip file block numbers targeted by a pending forwarded operation. In some embodiments of performing the synchronization, execution of framing operations may be modified to skip file block numbers that have been forwarded through forwarded operations and removed from the persistent memory file system 812 while framing was in progress. For example, there is a framing operation and a forwarded operation for a same file block number. If the forwarded operation executes first, then when the framing operation executes, the framing operation may be modified to skip the file block number. This is because the interleaving forwarded operation has rendered the framing for this file block number unnecessary because the forwarded operation now written the newer data to the storage 818 and the framing operation would otherwise incorrectly indicate that corresponding stale data within the persistent memory 814 is more up-to-date.

In some embodiments of synchronizing a consistency point operation and the forwarded operation, the forwarded operation may be suspended based upon a file block number targeted by the forwarded operation corresponding to a dirty block associated with the consistency point operation that is to store the dirty block to the storage 818. In some embodiments of implementing the forwarded operation in relation to implementing consistency point operations, the forwarded operation may transition from a frame dirty state for a next consistency point to a real dirty state. For example, the forwarded operation might target file block number 10 of file (X). Also, there may be a recent framing operation that executed for this file block number 10 of file (x). The framing operation would mark file block number 10 as having a frame dirty state that is expected to be cleaned (flushed to disk) during a next consistency point, thus the file block number has a "framed dirty state for a next consistency point." If this type of object (e.g., file block number 10) that has been marked with the "framed dirty state for a next consistency point" is targeted by a forwarded operation, then the forwarded operation is executed to make modifications, and the framed dirty state is overridden with a real dirty state because the file system tier 810 (storage system layer) now has real new data to flush to disk.

In some embodiments, a block within the persistent memory file system 812 may have a generation count associated with the block. The generation count may be increased each time data of the block is removed due to the data being stale because to a forwarded operation wrote newer data to a corresponding block in the storage 818 through the storage file system 816. A framing operation used to frame the block will include the generation count of the block within the persistent memory 814, which is compared with a generation count of the corresponding block within the storage 818 to see if the generation count is still valid. In this way, generation counts can be compared to detect invalid generation counts such that a framing operation may be modified to skip a file block number, having an invalid generation count, which has been forwarded and removed from the persistent memory file system 812 while framing was in progress.

Figure 9:
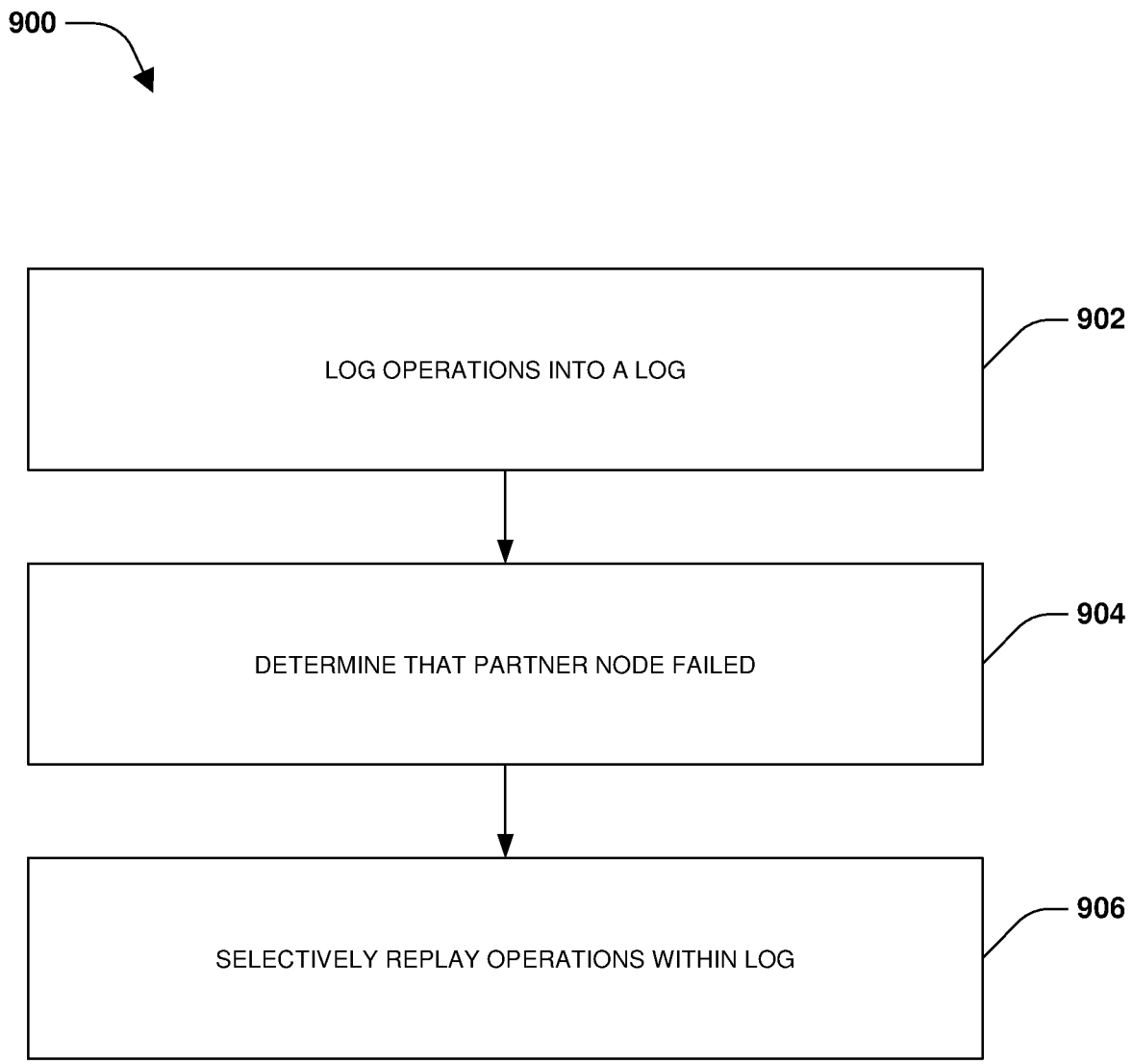
FIG. 9 is a flow chart illustrating an example of a set of operations that support forwarding of operations to bypass persistent memory in accordance with an embodiment of the invention.
Figure 10A:
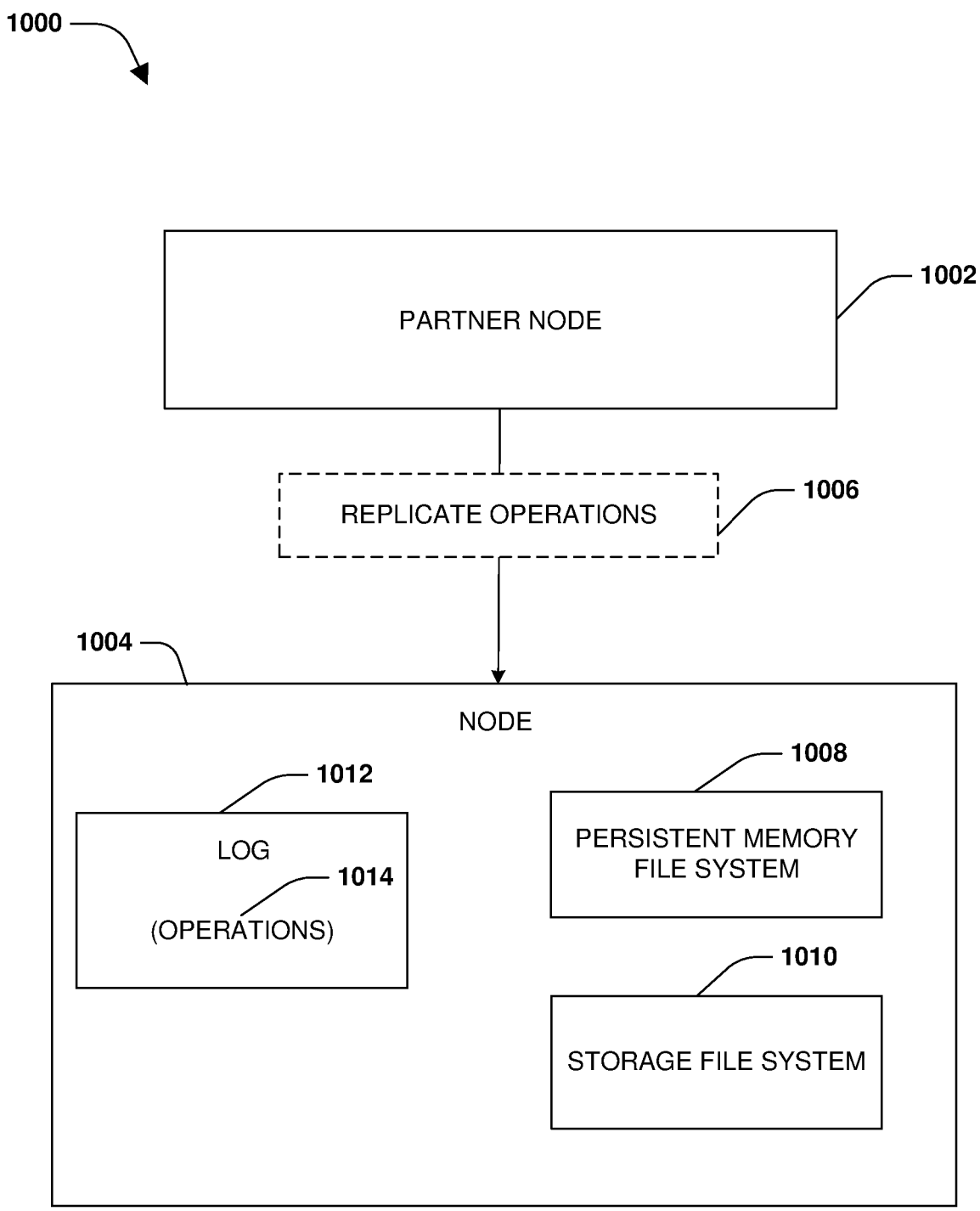
FIG. 10A is a block diagram illustrating an example of supporting the forwarding of operations to bypass persistent memory in accordance with an embodiment of the invention.
Figure 10B:
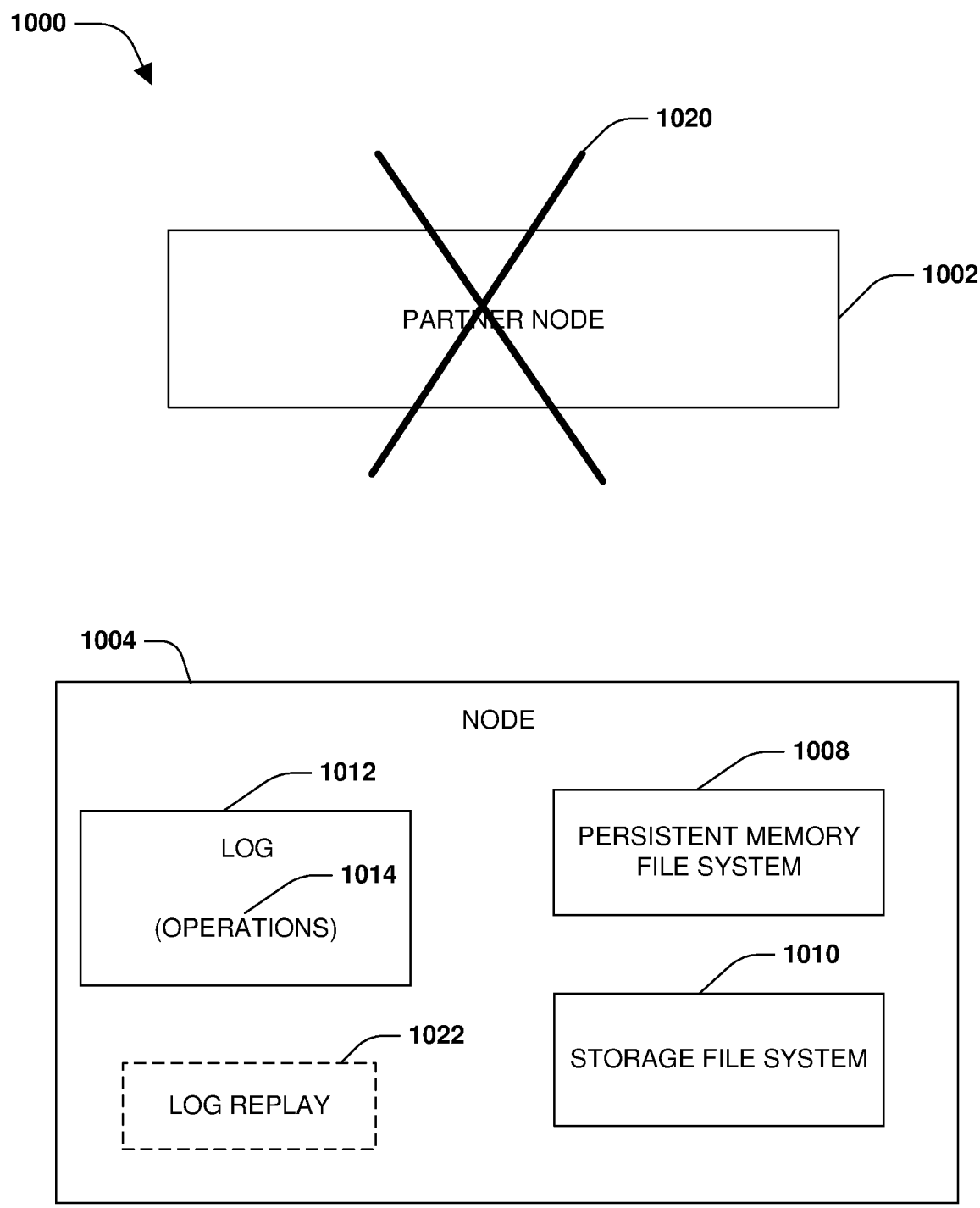
FIG. 10B is a block diagram illustrating an example of supporting the forwarding of operations to bypass persistent memory in accordance with an embodiment of the invention.

One embodiment of forwarding operations to bypass persistent memory is illustrated by an exemplary method 900 of FIG. 9 and further described in conjunction with system 1000 of FIGS. 10A and 10B. The system 1000 may comprise a node 1004, as illustrated by FIG. 10A. The node 1004 may implement a persistent memory file system 1008 used to store, organize, and provide access to data within persistent memory. The node 1004 may implement a storage file system 1010 to store, organize, and provide access to data within storage managed by the node 1004. In some embodiments, the node 1004 may be partnered with a partner node 1002, such as where the node 1004 and the partner node 1002 are high availability partners. Accordingly, operations and/or data may be mirrored between the node 1004 and the partner node 1002. For example, the partner node 1002 may locally execute operations, such as modify operations, forwarded operations, etc., and replicate 1006 the operations to the node 1004 that logs the operations into a log 1012 (e.g., non-volatile log (NVLog) as operations 1014, as illustrated by FIG. 10A. In this way, during operation 902 of method 900 of FIG. 9, the node 1004 may log the operations, executed by the partner node 1002 and mirrored/replicated from the partner node 1002 to the node 1004, into the log 1012 as the operations 1014.

During operation 904 of method 900 of FIG. 9, the node 1004 may determine that the partner node 1002 has failed 1020 such as by detecting a loss of a heartbeat, as illustrated by FIG. 10B. During operation 906 of method 900 of FIG. 9, the node 1004 may selectively replay 1022 certain operations of the operations 1014 within the log 1012. If an operation within the log 1012 is a forwarded operation, then the forwarded operation has two part. A first part of the forwarded operation corresponds to modifying the storage file system 1010 (e.g., writing new data into the storage of the storage file system 1010). A second part of the forwarded operation corresponds to modifying the persistent memory file system 1008 to remove stale data that was made stale based upon the new data being written into the storage of the storage file system 1010.

In some embodiments of the selectively replay 1022 of the operations 1014 within the log 1012, forwarded operations within the log 1012 are replayed to modify the storage file system 1010. Forwarded operations within the log 1012 are replayed upon the persistent memory file system 1008 if the forwarded operations target file block numbers with unknown block states. Forwarded operations that target file block numbers with known block states are skipped. In some embodiments, an unknown state means that a block is not part of the persistent memory file system 1008, and thus the persistent memory file system 1008 has no knowledge of the block. A known state means that the persistent memory file system 1008 tracks the block and owns the block. This ensures file system consistency and ensures that there is no data loss. After the operations 1014 are selectively replayed 1022 from the log 1012, the node 1004 may complete a takeover for the failed partner node 1002 and start processing operations in place of the failed 1020 partner node 1002.

Figure 11:
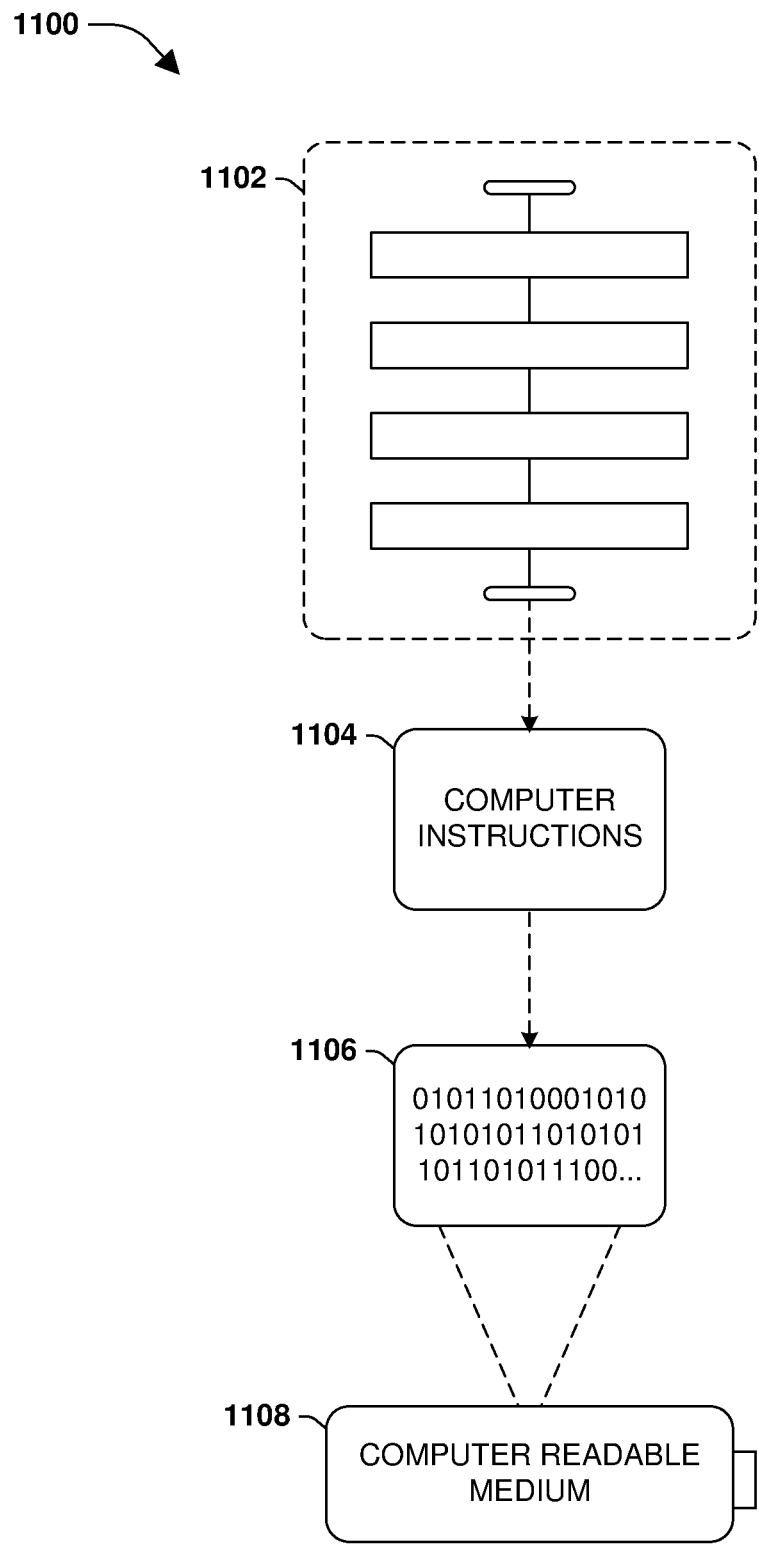
FIG. 11 is an example of a computer readable medium in which an embodiment of the invention may be implemented.

Still another embodiment involves a computer-readable medium 1100 comprising processor-executable instructions configured to implement one or more of the techniques presented herein. An example embodiment of a computer-readable medium or a computer-readable device that is devised in these ways is illustrated in FIG. 11, wherein the implementation comprises a computer-readable medium 1108, such as a compact disc-recordable (CD-R), a digital versatile disc-recordable (DVD-R), flash drive, a platter of a hard disk drive, etc., on which is encoded computer-readable data 1106. This computer-readable data 1106, such as binary data comprising at least one of a zero or a one, in turn comprises processor-executable computer instructions 1104 configured to operate according to one or more of the principles set forth herein. In some embodiments, the processor-executable computer instructions 1104 are configured to perform a method 1102, such as at least some of the exemplary method 500 of FIG. 5, at least some of the exemplary method 700 of FIG. 7, and/or at least some of the exemplary method 900 of FIG. 9, for example. In some embodiments, the processor-executable computer instructions 1104 are configured to implement a system, such as at least some of the exemplary system 400 of FIG. 4, at least some of the exemplary system 600 of FIG. 6, at least some of the exemplary system 800 of FIG. 8, and/or at least some of the exemplary system 1000 of FIGS. 10A and 10B, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system comprising:
   persistent memory managed by a persistent memory tier of a first node;
   storage managed by a file system tier of the first node, wherein the file system tier is configured to implement snapshot operations upon data stored across both the persistent memory and the storage;
   a frontend file system providing a client device with access to the data stored across the persistent memory by a persistent memory file system and across the storage by a storage file system; and
   the first node that:
      monitors pending access transfers from the first node to a second node for synchronizing changes made to the persistent memory tier of the first node to a persistent memory tier of the second node;
      in response to determining that current pending access transfers do not affect a consistency point of modifications to store from the persistent memory to the storage of the file system, performing the consistency point, otherwise, blocking the consistency point.

2. The system of claim 1, wherein the persistent memory tier is configured to reroute modify operations from the persistent memory tier to the file system tier for execution through the storage file system, wherein the rerouting is performed in response to an indication from the file system tier that a snapshot operation is to be implemented.

3. The system of claim 1, wherein the persistent memory tier is configured to notify the storage file system of blocks within the persistent memory file system that comprise more up-to-date data than corresponding blocks within the storage file system, wherein the notifying is performed in response to an indication from the file system tier that a snapshot operation is to be implemented.

4. A system comprising:
persistent memory managed by a persistent memory tier of a first node;
storage managed by a file system tier of the first node, wherein the file system tier is configured to implement snapshot operations upon data stored across both the persistent memory and the storage;
a frontend file system providing a client device with access to the data stored across the persistent memory by a persistent memory file system and across the storage by a storage file system; and
the persistent memory file system that:
executes a modify operation upon a target object stored within the persistent memory based upon forwarding not being enabled for the target object; and
forwards the modify operation to the storage file system for execution upon the storage based upon forwarding being enabled for the target object.

5. The system of claim 4, wherein the persistent memory tier reroutes modify operations from the persistent memory tier to the file system tier for execution through the storage file system, wherein the rerouting is performed in response to an indication from the file system tier that a snapshot operation is to be implemented.

6. The system of claim 4, wherein the persistent memory tier notifies the storage file system of blocks within the persistent memory file system that comprise more up-to-date data than corresponding blocks within the storage file system, wherein the notifying is performed in response to an indication from the file system tier that a snapshot operation is to be implemented.

7. The system of claim 4, wherein the first node:
monitors pending access transfers from the first node to a second node for synchronizing changes made to the persistent memory tier of the first node to a persistent memory tier of the second node;
in response to determining that current pending access transfers do not affect a consistency point of modifications to store from the persistent memory to the storage of the file system, performing the consistency point, otherwise, blocking the consistency point.

8. The system of claim 4, wherein the first node:
log, by the first node, the modify operation into a log of the first node;
execute, by the storage file system, the modify operation upon the target object within the storage; and
notify, by the storage file system, the persistent memory file system to remove a copy of the target object from the persistent memory.

9. The system of claim 4, wherein the first node:
in response to receiving a notification from the storage file system that the modify operation was logged and executed, remove a copy of the target object from the persistent memory; and
in response to removing the copy of the target object from the persistent memory, send a success notification to the client device that the modify operation is complete.

10. The system of claim 4, wherein the first node:
specifying a forwarding duration for the target object such that modify operations targeting the object are forwarded from the persistent memory file system to the storage file system for execution until expiration of the forwarding duration.

11. The system of claim 4, wherein the persistent file system forwards partial write operations to the storage file system for execution based upon the partial write operations targeting non-tier blocks not tiered from the storage to the persistent memory.

12. The system of claim 4, wherein the first node:
implements a forwarding policy specifying that hole punch operations and multi-block sequential write operations are to be forwarded from the persistent memory file system to the storage file system for execution.

13. The system of claim 4, wherein the persistent file system:
determines that a first modify operation spans a set of objects;
in response to determining that a subset of the set of objects satisfy a forward policy indicating that modifying operations targeting the subset of the set of objects are to be forwarded to the storage file system, forwarding the first modify operation to the storage file system.

14. A method, comprising:
managing, by a persistent memory tier, a persistent memory using a persistent memory file system;
managing, by a file system tier, storage using a storage file system;
providing, by a frontend file system, a client with access to data stored across the persistent memory by the persistent memory file system and across the storage by the storage file system;
implementing, by the file system tier, a snapshot operation for the data stored across the persistent memory by the persistent memory file system and across the storage by the storage file system;
identify blocks within the persistent memory file system that comprise more up-to-date data than corresponding blocks within the storage file system; and
notifying, by the persistent memory tier, the storage file system that the corresponding blocks are stale.

15. The method of claim 14, comprising:
providing, by the persistent memory tier, an indication of file block numbers of the blocks comprising the more up-to-date data; and
retrieving, by the storage file system, the more up-to-date data from the blocks within the persistent memory file system to overwrite the corresponding blocks in the storage file system.

16. The method of claim 14, comprising:
forwarding, by the persistent memory file system, modify operations to the storage file system as forwarded operations for execution upon the storage based upon forwarding being enabled for objects targeted by the modify operations.

17. The method of claim 16, comprising:
suspending, by the persistent memory file system, a forwarded operation based upon a determination that a pending framing operation is directed to a subset of file block numbers targeted by the forwarded operation.

18. The method of claim 16, comprising:
suspending, by the persistent memory file system, a forwarded operation based upon a determination that a file block number targeted by the forwarded operation correspond to a dirty block associated with a current consistency point that is to store the dirty block to the storage.

19. The method of claim 16, comprising:
modifying execution of framing operations to skip file block numbers targeted by pending forwarded operations.

20. A non-transitory machine readable medium comprising instructions, which when executed by one or more machines, causes the one or more machines to:
manage, by a persistent memory tier, a persistent memory using a persistent memory file system;
manage, by a file system tier, storage using a storage file system;
provide, by a frontend file system, a client with access to data stored across the persistent memory by the persistent memory file system and across the storage by the storage file system;
implement, by the file system tier, a snapshot operation for the data stored across the persistent memory by the persistent memory file system and across the storage by the storage file system; and
forward, by the persistent memory file system, modify operations to the storage file system as forwarded operations for execution upon the storage based upon forwarding being enabled for objects targeted by the modify operations.

21. The non-transitory machine readable medium of claim 20, wherein the instructions cause the one or more machines to: suspend, by the persistent memory file system, a forwarded operation based upon a determination that a pending framing operation is directed to a subset of file block numbers targeted by the forwarded operation.

22. The non-transitory machine readable medium of claim 20, wherein the instructions cause the one or more machines to: suspend, by the persistent memory file system, a forwarded operation based upon a determination that a file block number targeted by the forwarded operation correspond to a dirty block associated with a current consistency point that is to store the dirty block to the storage.

23. The non-transitory machine readable medium of claim 20, wherein the instructions cause the one or more machines to: modify execution of framing operations to skip file block numbers targeted by pending forwarded operations.

* * * * *